United States Patent
Chiwata

(10) Patent No.: US 7,306,312 B2
(45) Date of Patent: Dec. 11, 2007

(54) IMAGE FORMING APPARATUS AND IMAGE PROCESSING METHOD

(75) Inventor: Yuhei Chiwata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 73 days.

(21) Appl. No.: 11/384,285

(22) Filed: Mar. 21, 2006

(65) Prior Publication Data

US 2006/0214968 A1 Sep. 28, 2006

(30) Foreign Application Priority Data

Mar. 22, 2005 (JP) ............... 2005-082411

(51) Int. Cl.
B41J 2/205 (2006.01)
(52) U.S. Cl. .............. 347/15; 358/1.2; 358/1.3; 358/1.4; 358/1.8; 358/1.9; 358/502; 347/19; 347/43
(58) Field of Classification Search ............... 347/15, 347/19, 43; 358/1.2, 1.3, 1.4, 1.8, 1.9, 3.06, 358/3.13–3.19, 3.26–3.27, 502
See application file for complete search history.

(56) References Cited

U.S. PATENT DOCUMENTS 5,832,122 A * 11/1998 Shimazaki ............ 382/237
6,390,583 B1 * 5/2002 Kato et al. ............ 347/15
2006/0193010 A1 * 8/2006 Kakutani ............ 358/3.13

FOREIGN PATENT DOCUMENTS

JP 2000-307865 A 11/2000
JP 2004-168000 A 6/2004

OTHER PUBLICATIONS

"Digital Halftoning," R. Ulichney, The MIT Press, pp. 54-61 and pp. 236-239 (1987).

* cited by examiner

Primary Examiner—Matthew Luu
Assistant Examiner—Justin Seo
(74) Attorney, Agent, or Firm—Birch, Stewart, Kolasch & Birch, LLP

(57) ABSTRACT

The image forming apparatus forms an image on a prescribed recording medium by carrying out digital halftoning using a threshold value matrix. The image forming apparatus comprises: a plurality of nozzles which eject ink toward the recording medium to form an image; an ejection characteristics determination device which determines ejection characteristics of each of the nozzles; and a threshold value correction device which performs first threshold value correction to reduce density non-uniformity occurring in the image due to error in the ejection characteristics of the nozzles, by correcting the threshold value matrix according to the error in the ejection characteristics of the nozzles, and performs second threshold value correction to reduce granularity in the image by correcting the threshold value matrix having undergone the first threshold value correction, according to threshold values in the threshold value matrix.

9 Claims, 23 Drawing Sheets

BINARY SIGNAL

BLUE NOISE CHARACTERISTICS

RADIALLY AVERAGE

RADIAL FREQUENCY $f_r$

R. A. P. S.
(RADIALLY AVERAGED POWER SPECTRUM)

RADIAL FREQUENCY $f_r$

IMAGE FORMING APPARATUS AND IMAGE PROCESSING METHOD

BACKGROUND OF THE INVENTION

1. Field of the Invention

The present invention relates to an image forming apparatus and image processing method, and more particularly, to an image forming apparatus and image processing method for optimizing an image formed on a prescribed recording medium by means of a digital halftoning method using a threshold value matrix.

2. Description of the Related Art

There is known an image forming apparatus which forms images on a recording medium, such as paper, by ejecting ink from nozzles toward the recording medium, while moving an inkjet head having an arrangement of a plurality of nozzles and the recording medium, relatively with respect to each other.

In an image forming apparatus of this kind, if there is a nozzle having a larger droplet ejection volume (or a smaller droplet ejection volume) than the other nozzles, then non-uniformity in density which is visible as banding occurs in the image formed on the recording medium.

In order to reduce density non-uniformity occurring due to droplet ejection errors in nozzles, in general, the image data is corrected on the basis of the droplet ejection characteristics of the nozzles. A specific example of a correction object is droplet ejection rate information in which the surface area of the density graduation information of the image data is modulated.

However, if the image data is corrected in order to reduce non-uniformities in density, then generally, the granularity of the image formed on the recording medium becomes worse.

Japanese Patent Application Publication No. 2000-307865 discloses that an upper limit and a lower limit are set for the correction of the image data, in such a manner that degradation of the granularity be restricted to a minimum. However, if the upper and lower limit values are provided for correction of the image data, then this places limitations on the correction of density non-uniformities, and therefore density non-uniformities may not be corrected sufficiently in cases where the droplet ejection error of a nozzle exceeds the limit of the correction.

Japanese Patent Application Publication No. 2004-168000 discloses a method in which, if there is a droplet ejection error, such as a droplet ejection volume larger than the ideal value in a nozzle, then dots of a normal density are switched to dots of lower density by ejecting droplets of a light-colored ink. However, if the normal density dots are switched to the low-density dots using droplet ejection of light-colored ink, then since this method is premised on the use of light-colored inks, it cannot be applied to image forming apparatuses which do not use light-colored inks. Moreover, in a method using light-colored inks of this kind, it is not possible to perform correction to increase the density of the dots.

SUMMARY OF THE INVENTION

The present invention has been contrived in view of the foregoing circumstances, an object thereof being to provide an image forming apparatus and image processing method whereby density non-uniformities in an image formed on a recording medium can be reduced, while also preventing deterioration of the granularity of the image.

In order to attain the aforementioned object, the present invention is directed to an image forming apparatus which forms an image on a prescribed recording medium by carrying out digital halftoning using a threshold value matrix, the apparatus comprising: a plurality of nozzles which eject ink toward the recording medium to form an image; an ejection characteristics determination device which determines ejection characteristics of each of the nozzles; and a threshold value correction device which performs first threshold value correction to reduce density non-uniformity occurring in the image due to error in the ejection characteristics of the nozzles, by correcting the threshold value matrix according to the error in the ejection characteristics of the nozzles, and performs second threshold value correction to reduce granularity in the image by correcting the threshold value matrix having undergone the first threshold value correction, according to threshold values in the threshold value matrix.

According to the present invention, density non-uniformity in the image is reduced by correcting the threshold value matrix on the basis of the error in the ejection characteristics of the nozzles, while at the same time, the granularity of the image is reduced by further correcting the threshold value matrix thus corrected, on the basis of the threshold values in the threshold value matrix. Consequently, it is not necessary to provide correction limits, and furthermore, by optimizing the threshold value matrix in advance, prior to on-demand image formation, it is -possible to form images of high-quality on demand at high-speed, while achieving satisfactory correction of density non-uniformities and avoiding deterioration of the granularity of the image.

Preferably, the threshold value correction device performs the first threshold value correction by specifically considering a threshold value column corresponding to a nozzle having error in the ejection characteristics, of a plurality of threshold value columns in the threshold value matrix corresponding respectively to the nozzles, and multiplying a plurality of threshold values in the threshold value column under consideration by a correction coefficient corresponding to the error in the ejection characteristics of the nozzle.

According to this aspect of the present invention, the density non-uniformities of a dot row corresponding to the nozzle having the error in its ejection characteristics can be corrected satisfactorily.

Preferably, the threshold value correction device performs the second threshold value correction by exchanging threshold values for each other, within one of a plurality of threshold value columns in the threshold value matrix corresponding respectively to the nozzles.

According to this aspect of the present invention, the granularity is reduced, while maintaining the accuracy of the density non-uniformity correction.

Preferably, the threshold value correction device calculates a prescribed granularity index according to threshold values in the threshold value matrix, and performs the second threshold value correction in such a manner that the granularity index comes within a target range.

According to this aspect of the present invention, it is possible to generate an image in which the granularity index is reduced to within a prescribed range.

Preferably, the threshold value correction device calculates Radially Averaged Power Spectrum (R.A.P.S.) of the threshold value matrix by excluding power corresponding to a direction in which density non-uniformity occurs, and performs the second threshold value correction in such a manner that the granularity index specified by the R.A.P.S. comes within the target range.

According to this aspect of the present invention, the density non-uniformity component corresponding to the direction in which the density non-uniformity occurs is excluded from the components of the threshold value matrix, and hence the granularity can be reduced which maintaining the accuracy of the density non-uniformity correction.

Preferably, the threshold value correction device calculates the R.A.P.S. by: taking a threshold value column direction of the threshold value matrix corresponding to the direction in which the density non-uniformity occurs one-dimensionally, to be a y axis of the threshold value matrix; taking one of frequency coordinate axes in a two-dimensional coordinate system (fx, fy) expressing a two-dimensional power spectrum of the threshold value matrix corresponding to the y axis of the threshold value matrix, to be an fy axis; taking the other of the frequency coordinate axes perpendicular to the fy axis, to be an fx axis; taking a radial coordinate system corresponding to the two-dimensional coordinate system (fx, fy), to be (fr, θ); specifying an angle $\theta_0$ to define a range to be excluded from calculation of the R.A.P.S., of all angles of the radial coordinate system ($0° \leq \theta \leq 360°$) such that power caused by the first threshold value correction and appearing on and around the fx axis is excluded from determination of the granularity; and calculating the R.A.P.S. by excluding the range defined by the angle $\theta_0$.

Preferably, the threshold value correction device divides the threshold value matrix into a plurality of divided areas and performs the second threshold value correction for each of the divided areas.

According to this aspect of the present invention, it is possible to perform correction for reducing the granularity, at high speed.

Preferably, the divided areas overlap partially with each other at an overlap section; when evaluating the granularity relating to each of the divided areas, the threshold value correction device evaluates the granularity relating to each of the divided areas by including the overlap section in each of the divided areas to which the overlap section belongs; and when performing the second threshold value correction for the divided areas, the threshold value correction device corrects the threshold values in each of the divided areas by permitting threshold value correction in the overlap section in respect of one of the overlapping divided areas, while exclusively prohibiting the threshold value correction in that overlap section in respect of the other of the overlapping divided areas.

According to this aspect of the present invention, it is possible to achieve both high-speed correction for reducing granularity, and matching of the threshold values between respective divided areas, and therefore, local worsening of the granularity or the appearance of texture corresponding to the size of the divided areas can be prevented.

In order to attain the aforementioned object, the present invention is also directed to an image processing method of optimizing an image formed on a prescribed recording medium by means of a digital halftoning method using a threshold value matrix, the method comprising the steps of: determining ejection characteristics of each of a plurality of nozzles which eject ink onto a recording medium; performing a first threshold value correction to reduce density non-uniformity occurring in the image due to error in the ejection characteristics of the nozzles, by correcting the threshold value matrix according to the error in the ejection characteristics of the nozzles; and performing a second threshold value correction to reduce granularity in the image by correcting the threshold value matrix having undergone the first threshold value correction, according to threshold values in the threshold value matrix.

By optimizing the threshold value matrix in advance for each image forming apparatus, by carrying out image processing of this kind for optimizing the image prior to shipment of the image forming apparatus, then it is possible to form high-quality images in the case of on-demand image formation. Furthermore, it is also possible to take account of the change in ejection characteristics over the passage of time, by carrying out this image processing periodically, for example, after shipment of the image forming apparatus, and reconstructing the threshold value matrix accordingly.

According to the present invention, it is possible satisfactorily to reduce density non-uniformnities in an image formed on a recording medium, while also preventing degradation of the granularity of the image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Composition of Image Forming Apparatus

Figure 1:
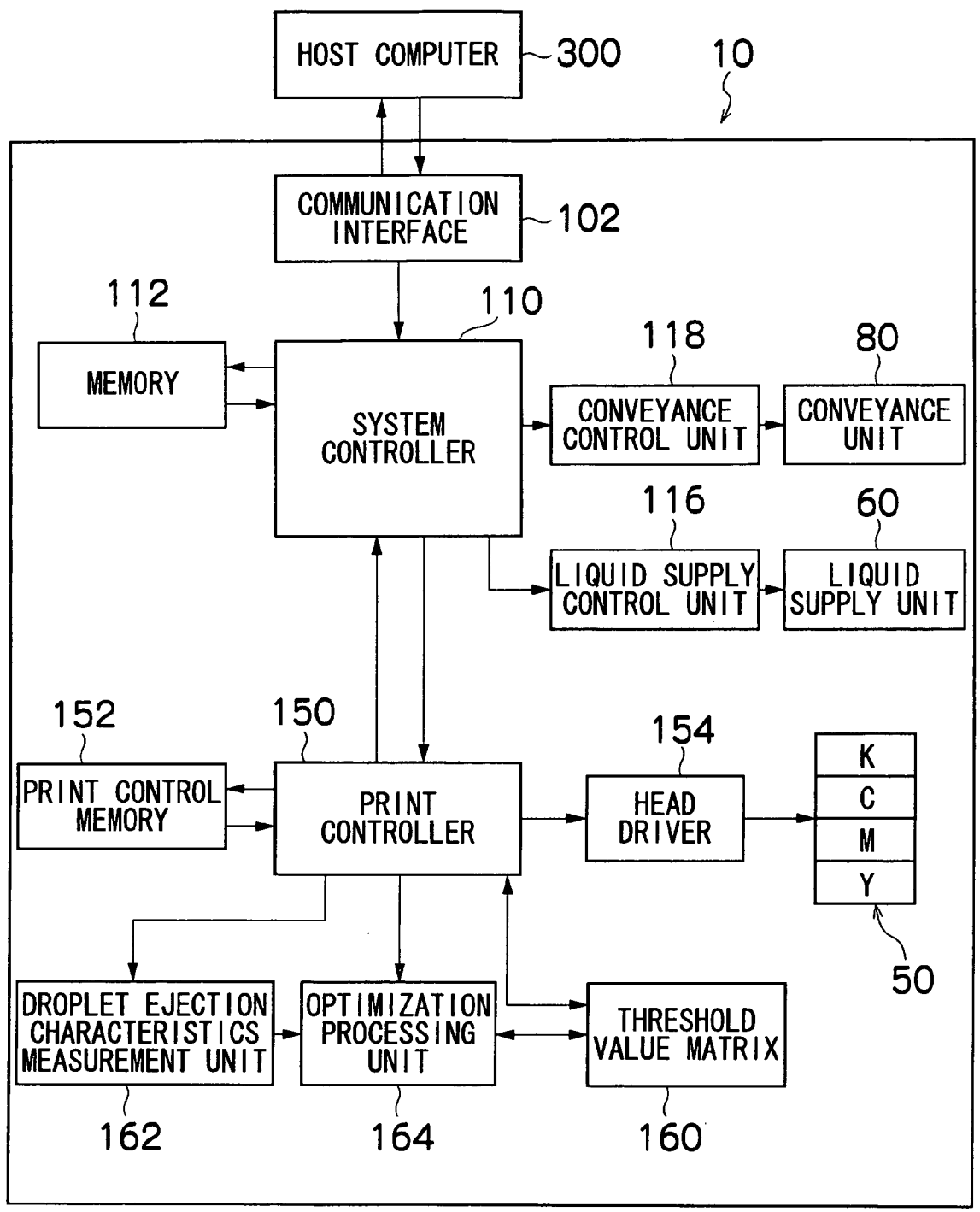
FIG. 1 is a block diagram showing the general composition of an image forming apparatus according to an embodiment of the present invention.

FIG. 1 is a block diagram showing the general composition of an image forming apparatus according to an embodiment of the present invention.

In FIG. 1, the image forming apparatus 10 according to the present embodiment comprises an inkjet head 50, a liquid supply unit 60, a conveyance unit 80, a communication interface 102, a system controller 110, a memory 112 (memory for system controller), a liquid supply control unit 116, a conveyance control unit 118, a print controller 150, a print control memory 152, a head driver 154, a threshold value matrix 160, a droplet ejection characteristics measurement unit 162 (ejection characteristics determination device), and an optimization processing unit 164 (threshold value correction device).

The plurality of inkjet heads 50 eject droplets of ink toward a recording medium, such as paper. The image forming apparatus 10 has at least inkjet heads 50 for the ink colors of C (cyan), M (magenta), Y (yellow), and K (black). In the image forming apparatus 10, ejection of droplets of light-colored ink, such as LC (light cyan) and/or LM (light magenta) is not essential, but it is also possible to provide inkjet heads 50 for light-colored inks of this kind.

The liquid supply unit 60 supplies inks of the respective colors to the inkjet heads 50. The liquid supply unit 60 comprises tubing channels which lead to the inkjet heads 50 from an ink storage section (not shown), such as ink cartridges detachably installed in the image forming apparatus 10, and pumps.

The conveyance unit 80 conveys the recording medium along a prescribed conveyance path. For example, it comprises a conveyance belt on which the recording medium is held by suction, conveyance rollers which drive the conveyance belt, and a conveyance motor which drives the conveyance rollers. The conveyance unit 80 moves the recording medium and the inkjet heads 50, relatively with respect to each other, in the conveyance direction of the recording medium (the sub-scanning direction).

The communication interface 102 is an image data acquisition unit which acquires image data by means of communications with a host computer 300. The communication interface 102 uses, for example, a wired communication interface, such as USB (Universal Serial Bus), IEEE 1394, Ethernet, or the like, or a radio communication interface. Image data sent from the host computer 300 is read into the image forming apparatus 10 through the communication interface 102, and is stored temporarily in the memory 112.

The mode of acquiring the image data is not limited in particular to a mode where the data is acquired by means of communications with the host computer 300. For example, it is also possible to acquire image data by reading in image data from a removable medium, such as a memory card or optical disk.

The system controller 110 is constituted by a central processing device (CPU) and peripheral circuits thereof, and the like, and it functions as a main control unit for controlling the whole of the image forming apparatus 10 in accordance with a prescribed program, as well as a calculation unit for performing various calculations relating to image processing. The system controller 110 controls the various sections of the image forming apparatus 10, such as the communication interface 102, the memory 112, the liquid supply control unit 116, the conveyance control unit 118, the print control unit 150, and the like.

The program executed by the system controller 110 and the various types of data which are required for control procedures are stored in the memory 112. Furthermore, the memory 112 is used as a temporary storage region for the acquired image data, as well as being used as a calculation work area.

The liquid supply control unit 116 controls the supply of ink to the inkjet heads 50 from the liquid supply unit 60, in accordance with instructions from the system controller 110.

The conveyance control unit 118 is a driver (drive circuit) which drives the conveyance unit 80 in accordance with instructions from the system controller 110.

The print controller 150 has functions for carrying out processing for generating a dot pattern (binary signal or multiple-value signal) from the image data from the memory 112, and correctional processing of the threshold value matrix 160 by means of the optimization processing unit 164 described later, in accordance with instructions from the system controller 110.

The print control memory 152 is provided in the print controller 150, and image data, parameters, and other data are temporarily stored in the print control memory 152 when the image is processed in the print controller 150. In FIG. 1, the print control memory 152 is depicted as being attached to the print controller 150; however, it may also be combined with the system control memory 112. Also possible is a mode in which the print controller 150 and the system controller 110 are integrated to form a single processor.

Image data (for example, RGB data) inputted from the host computer 300 through the communication interface 102 is accumulated temporarily in the memory 112, as described above, and the image data accumulated in the memory 112 is subjected to prescribed conversion processing, and then supplied to the print controller 150 under the control of the system controller 110. In the print controller 150, the data is subjected to halftoning using the threshold value matrix 160, thereby converting the data into a dot pattern for each ink color of C (cyan), M (magenta), Y (yellow) and K (black). If the dot pattern is a binary signal, then it includes data having two values (1 or 0) indicating whether or not to eject a droplet from a nozzle. If the dot pattern is a multiple-value signal, then rather than simply indicating whether or not a droplet is ejected, the pattern can also indicate the droplet ejection volume (or the dot size). The dot pattern generated using the threshold value matrix 160 is supplied to the head driver 154.

The head driver 154 generates a drive signal for the inkjet head 50, in accordance with the supplied dot pattern. By supplying the drive signal generated by the head driver 154 to the inkjet head 50, droplets of ink of a prescribed volume(s) are ejected from the nozzles corresponding to the dot pattern.

By controlling ejection of ink droplets from the inkjet head 50 in synchronization with the conveyance speed of the recording paper, a desired image is formed on the recording medium.

The droplet ejection characteristics determination unit 162 determines the droplet ejection characteristics of the inkjet head 50 by actually measuring the droplet ejection characteristics of the inkjet head 50. A concrete embodiment of the droplet ejection characteristics determination unit 162 is described in detail later.

The determination of the droplet ejection characteristics is not limited to a case where the characteristics are acquired by actual measurement in the image forming apparatus 10. For example, the droplet ejection characteristics may be determined according to image data read on the recording medium, by means of a device external to the image forming apparatus 10 (for example, a scanner), or the actual droplet ejection characteristics themselves may be acquired from the host computer 300, or the like, as a result of analysis.

The optimization processing unit 164 carries out optimization processing with respect to the threshold value matrix 160, in accordance with the droplet ejection characteristics of the inkjet head 50. This optimization processing is described in detail later.

In the image forming apparatus 10, optimization processing of the threshold value matrix 160 in accordance with the droplet ejection characteristics of the inkjet head 50 is previously carried out by the optimization processing unit 164, and when forming an image, a high-quality image can be formed on demand at high speed by using the previously optimized threshold value matrix 160.

Structure of Inkjet Head

Figure 2:
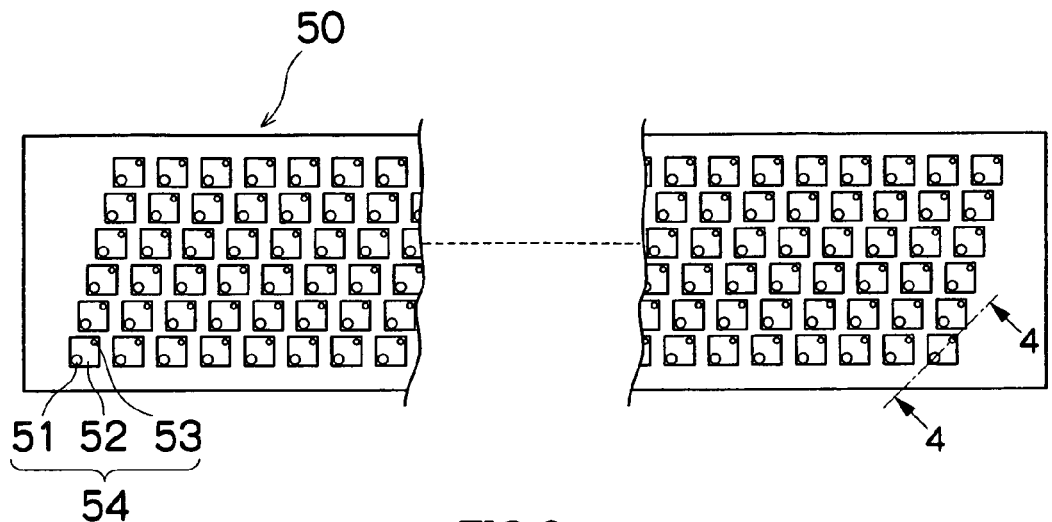
FIG. 2 is a plan view perspective diagram schematically showing the structure of an embodiment of an inkjet head.

FIG. 2 is a plan view perspective diagram schematically showing the structure of an embodiment of the inkjet head 50.

In FIG. 2, the inkjet head 50 has a plurality of nozzles 51 (droplet ejection ports) arranged through a length exceeding at least one edge of the maximum-size recording paper, and the inkjet head 50 ejects droplets of ink onto the recording medium from the nozzles 51, while moving relatively with respect to the recording medium, such as paper.

The inkjet head 50 comprises a two-dimensional arrangement of a plurality of pressure chamber units 54, each having the nozzle 51 ejecting droplets of the ink, a pressure chamber 52 connected to the nozzle 51, which applies pressure to the ink when ejecting an ink droplet from the nozzle 51, and an ink supply port 53 which supplies the ink to the pressure chamber 52 from a common liquid chamber, which is described hereinafter and is omitted from FIG. 2.

Figure 3:
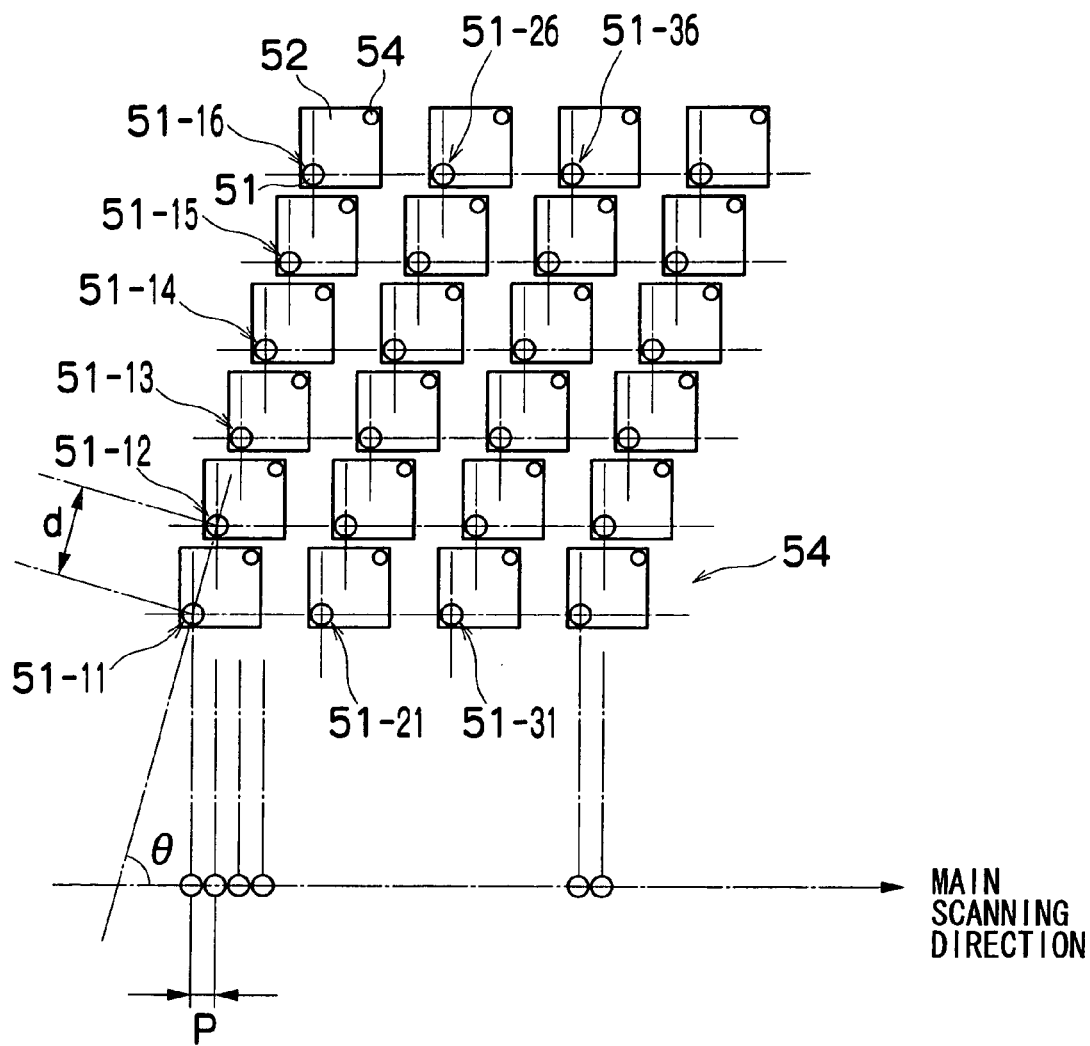
FIG. 3 is an enlarged diagram showing a partial enlarged view of the inkjet head shown in FIG. 2.

FIG. 3 shows an enlarged view of a portion of the inkjet head 50 shown in FIG. 2.

In FIG. 3, the plurality of nozzles 51 are arranged in line with the main scanning direction, and are also arranged in a direction that forms a prescribed angle of θ with respect to the main scanning direction. In other words, the plurality of nozzles 51 are arranged in a so-called two-dimensional matrix.

More specifically, m nozzles denoted with the reference numerals 51-11, 51-21, 51-31, and so on (or reference numerals 51-16, 51-26, 51-36, and so on) are arranged in the main scanning direction. Furthermore, for example, n (in this embodiment, n=6) nozzles denoted with the reference numerals 51-11, 51-12, 51-13, 51-14, 51-15 and 51-16 are arranged in a direction forming the angle of θ with respect to the main scanning direction.

The virtual nozzle arrangement (project nozzle arrangement) in which all of the nozzles 51 are projected onto a single line in the main scanning direction (main scanning line) is composed of the nozzles 51 arranged at substantially the same interval as the dot pitch P in the main scanning direction (and more specifically, as the interval in the main scanning direction between dots formed on the recording medium by deposition of droplets of ink from the nozzles 51). In other words, the projected nozzle arrangement is a nozzle arrangement having substantially the same pitch as the dot pitch P.

In practice, the interval between nozzles 51 (nozzle pitch) is n times (in this embodiment, n=6) the dot pitch P in the main scanning direction, and the interval is d (=P/cos θ), as shown in FIG. 3, in the direction which forms the angle of θ with respect to the main scanning direction.

Figure 4:
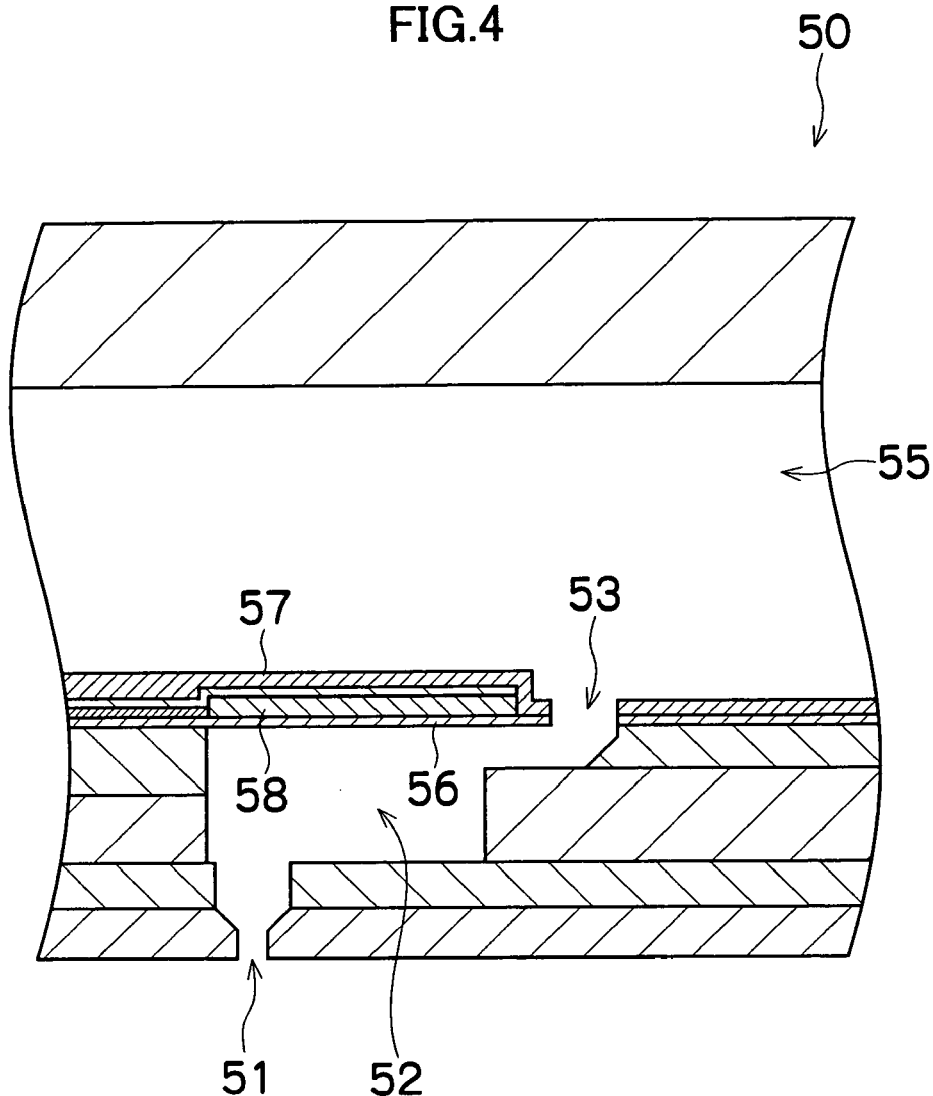
FIG. 4 is a cross-sectional diagram along line 4-4 in FIG. 2.

FIG. 4 shows one of the pressure chambers 52 and the periphery thereof, in a cross-sectional view along line 4-4 in FIG. 2. FIG. 4 shows one nozzle 51 ejecting droplets of ink, one pressure chamber 52 connected to the nozzle 51, one ink supply port 53 through which ink supplied to the pressure chamber 52 passes, one individual electrode 57 to which an electrical signal (drive signal) is applied from the head driver 154 shown in FIG. 1, and one piezoelectric element 58 generating a displacement (distortion) in accordance with the drive signal applied to the individual electrode 57, but in practice, the nozzles 51, the pressure chambers 52, the ink supply ports 53, the individual electrodes 57, the and piezoelectric elements 58 are provided in a two-dimensional matrix.

A diaphragm 56 is disposed on the opposite side of the pressure chambers 52 from the side where the nozzles 51 are disposed, and the diaphragm 56 is formed as a single plate, which is common for all of the plurality of pressure chambers 52. The diaphragm 56 composes vibrating surfaces of the pressure chambers 52 and when the diaphragm 56 vibrates due to the displacement of the piezoelectric element 58, the volume of the pressure chamber 52 changes accordingly.

The common liquid chamber 55 is disposed on the opposite side of the diaphragm 56 from the side where the pressure chambers 52 are situated, and the common liquid chamber 55 supplies the ink to the plurality of pressure chambers 52 through the ink supply ports 53, which are formed in the diaphragm 56. More specifically, when the pressure chambers 52 are observed with the nozzles 51 facing downward, the common liquid chamber 55 is formed as a single common liquid chamber directly above the plurality of pressure chambers 52, in such a manner that the common liquid chamber 55 covers all of the plurality of pressure chambers 52. By means of the common liquid chamber 55 of this kind, the ink is supplied to the pressure chambers 52 arranged in a two-dimensional matrix, while achieving good refilling characteristics.

One of the electrodes of each piezoelectric element 58 is constituted by the individual electrode 57, and is connected to the head driver 154 shown in FIG. 1 through the individual electrode 57. The other electrode of the piezoelectric element 58 is constituted by the diaphragm 56 (common electrode), and is connected to earth.

The piezoelectric element 58 generates distortion in accordance with the drive signal applied from the head driver 154 through the individual electrode 57. When the piezoelectric element 58 distorts, the diaphragm 56 vibrates, thereby changing the volume of the pressure chamber 52, and causing a droplet of ink to be ejected from the nozzle 51.

Basic Image Processing

The image forming apparatus 10 according to the present embodiment forms an image on a recording medium on the basis of image data acquired by means of communications with the host computer 300 as shown in FIG. 1. More specifically, images are formed by an on-demand system, on the basis of a request from the host computer 300.

Figure 5:
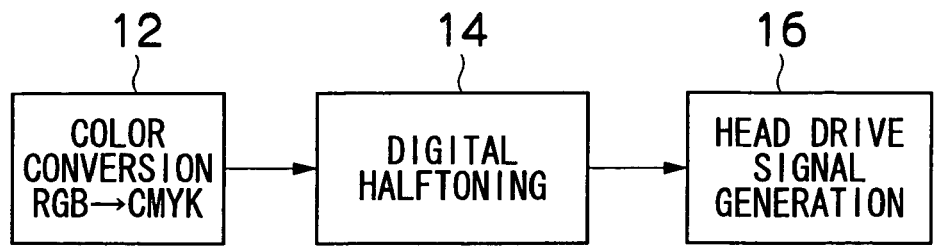
FIG. 5 is a block diagram showing a general view of an image processing function in the image forming apparatus.

FIG. 5 is a block diagram showing the general composition of an image processing function of the image forming apparatus 10. The image forming apparatus 10 comprises; a color conversion unit 12, which converts the RGB data into CMYK data corresponding to same; a digital halftoning unit 14, which generates a dot pattern by carrying out digital halftoning on the CMYK data, using a prescribed threshold value matrix; and a head drive signal generating unit 16, which generates a drive signal for the inkjet head 50 on the basis of the dot pattern.

If the digital halftoning unit 14 has a threshold value matrix and a processor which uses this threshold value matrix, then the threshold value matrix is information which causes the processor to execute a function of reducing density non-uniformities in the image and a function for reducing granularity, and hence the threshold value matrix resembles a program. Furthermore, the digital halftoning unit 14 may also be constituted by a memory as such which stores a threshold value matrix and outputs a dot pattern when CMYK data is input.

To provide a simple description of an embodiment of the correspondence between the compositional elements of the image processing function shown in FIG. 5 and the compositional elements of the overall configuration shown in FIG. 1, the color conversion unit 12 is constituted by the system controller 110 (or the print controller 150 shown in FIG. 1), the digital halftoning unit 14 in FIG. 5 is constituted by the print controller 150 and the threshold value matrix 160 shown in FIG. 1, and the head drive signal generating unit 16 in FIG. 5 is constituted by the head driver 154 shown in FIG. 1.

Figure 6:
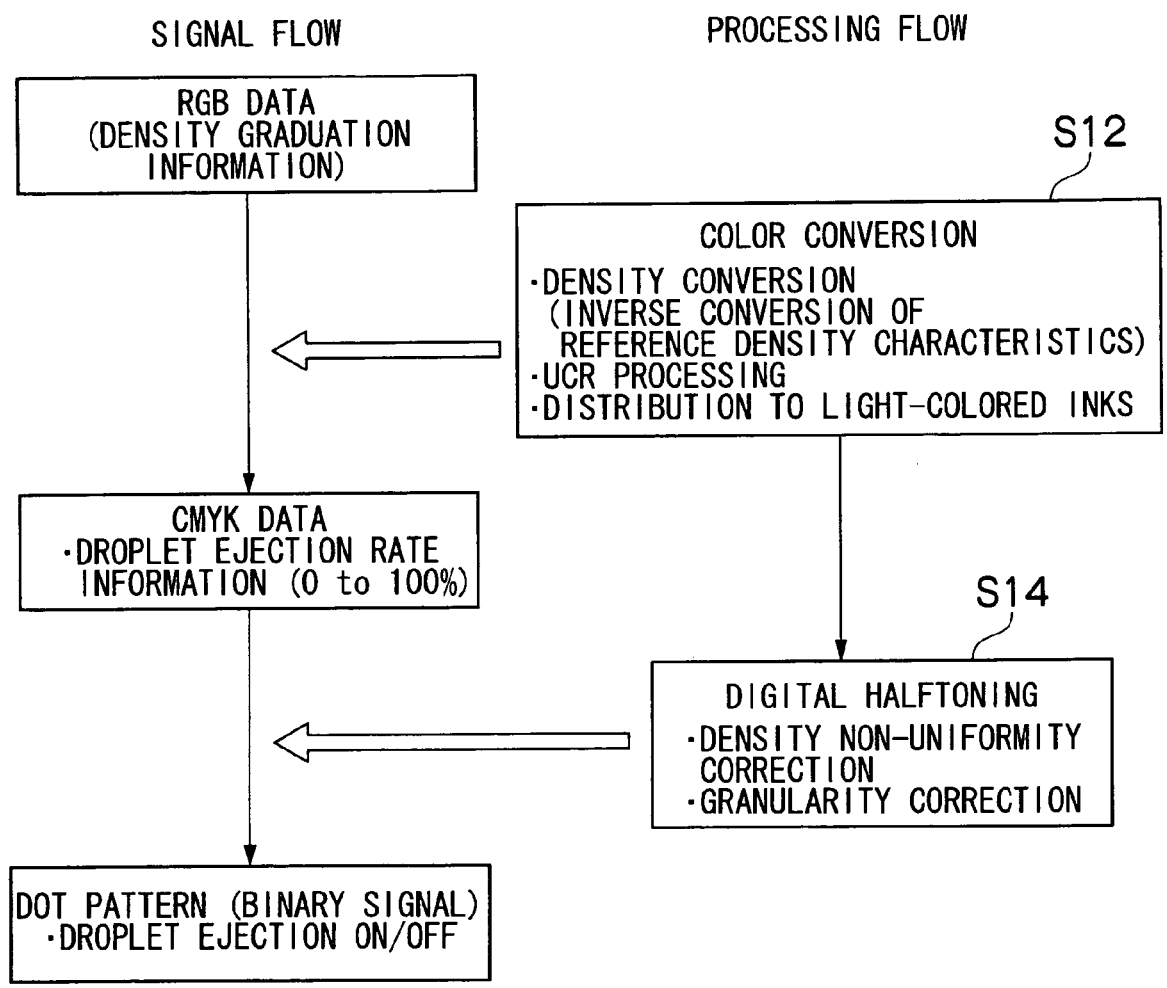
FIG. 6 is a general flowchart showing the sequence of basic image processing.

FIG. 6 is a conceptual flowchart showing the sequence of basic image processing and signal flow implemented during on-demand image formation.

The RGB data is constituted by an arrangement of original pixels including density graduation values for the colors of R, G and B, corresponding to the image contents.

The CMYK data is constituted by an arrangement of color converted pixels including density graduation values for the colors of C, M, Y and K, corresponding to the image contents. Below, a case is described where the CMYK data represents the droplet ejection rate (0 to 100%) obtained by carrying out a surface area modulation of the density graduation values.

The dot pattern includes values which indicate the size and position of dots to be formed on the recording medium. In the embodiment described below, the target dot size is fixed, and the dot pattern is represented by binary signals which indicate droplet ejection on "1" or droplet ejection off "0".

In FIG. 6, firstly, the RGB data is color converted into CMYK data (S12).

This color conversion processing also includes density conversion (inverse conversion of the reference density characteristics). Furthermore, the color conversion processing also includes UCR (Under Color Removal), in which the K ink is used in dark regions where the three inks of C, M and Y are overlapping, instead of the inks of C, M and Y. Furthermore, the present embodiment is described with respect to an embodiment where the four inks of C, M, Y and K are used, but in a case where light inks such as LC (light cyan) and LM (light magenta) are also used in addition to the C, M, Y and K inks, the processing for distributing data to these light inks is also carried out.

Furthermore, in color conversion processing, surface area modulation is carried out and droplet ejection rate information (0 to 100%) is calculated for each pixel. Here, the droplet ejection rate corresponds to the amount of ink per pixel.

In order to simplify the description, a case is described here where one unit of the droplet ejection rate information corresponds to one dot on the recording medium. The droplet ejection rate represents a virtual ink volume, rather than the actual amount of ink ejected from a nozzle per pixel of the CMYK data, and in the present embodiment, the droplet ejection rate indicates the probability of a droplet being ejected by one nozzle.

In the image forming apparatus 10, it is necessary to form an image which appears to provide a continuous tonal graduation to the human eye, by changing the droplet ejection density and dot size for fine dots formed by ink (coloring material).

Digital halftoning is carried out by using the threshold value matrix with respect to the droplet ejection rate information forming CMYK data, thereby generating a dot pattern which forms image data creating a pseudo continuous graduation of tones (S14).

Figure 7:
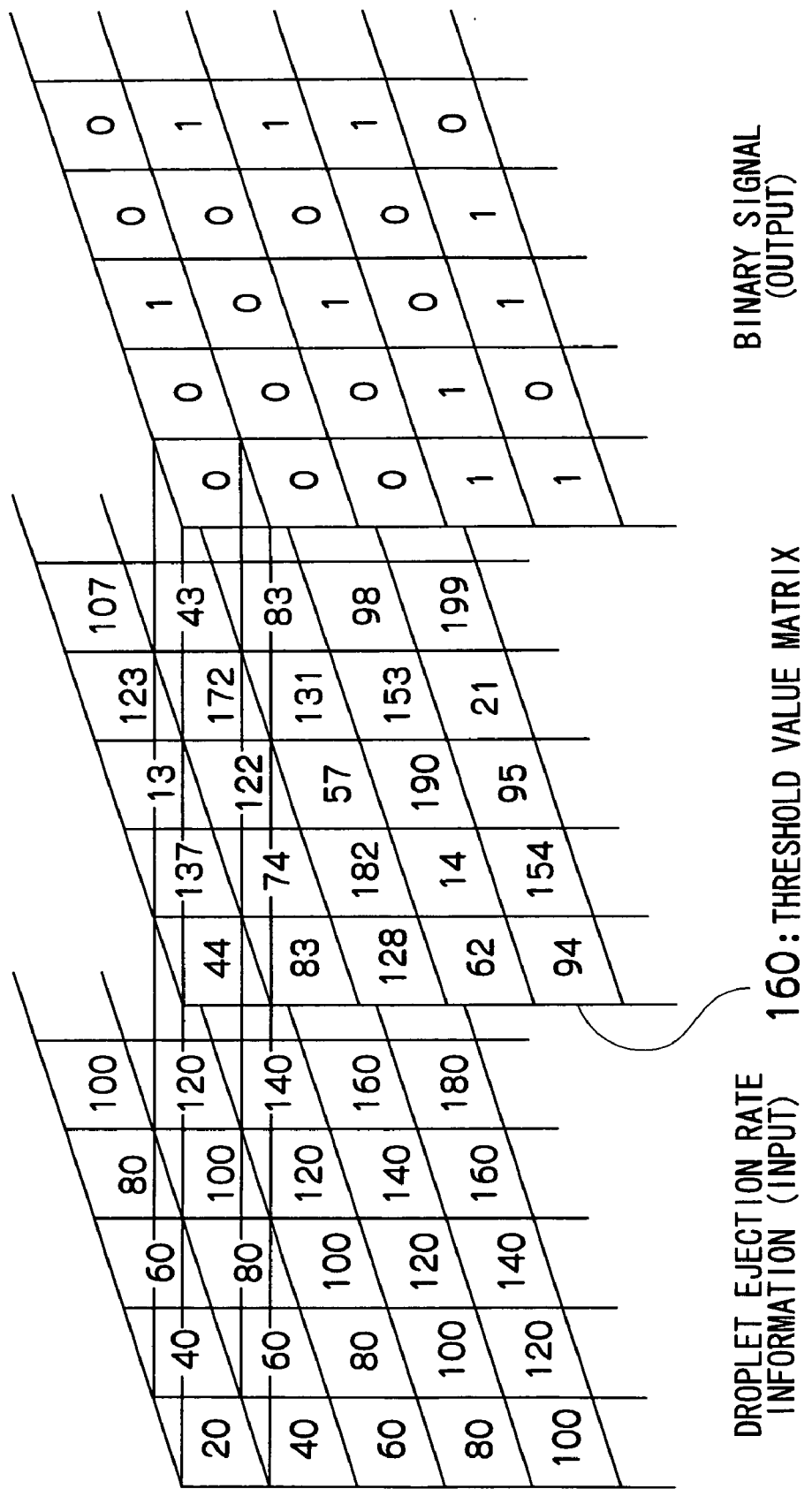
FIG. 7 is an illustrative diagram for explaining a threshold value matrix.

When the droplet ejection rate for each pixel (a rate of 0 to 100% normalized to a range of 0 to 255) is input, the threshold value matrix 160 shown in FIG. 7 outputs binary signals of two values, droplet ejection on, "1", and droplet ejection off, "0", as a dot pattern.

A dot having a droplet ejection rate that is smaller than the threshold value is binarized by being set to "0" (droplet ejection off). On the other hand, a dot having a droplet ejection rate that is equal to or greater than the threshold value is binarized by being set to "1" (droplet ejection on).

For example, in FIG. 7, the droplet ejection rate of the pixel in the top left-hand corner is "20" and the threshold value corresponding to this pixel is "44", and since 20<44, then the dot corresponding to this pixel is converted to a binary value of "0" (droplet ejection off).

The droplet ejection rate information shown in FIG. 7 is information in which the density increases (i.e., the value becomes higher) from the top left-hand side to the bottom right-hand side. As a result of the halftoning of this droplet ejection rate information, a dot pattern is outputted to form an image that is observed to simply become more dense from the top left-hand side to the bottom right-hand side, and moreover, to faithfully reproduce the tonal graduation (light and dark shading) of the original image, without creating the impression of density non-uniformities or granularity to a human observer.

Figure 8:
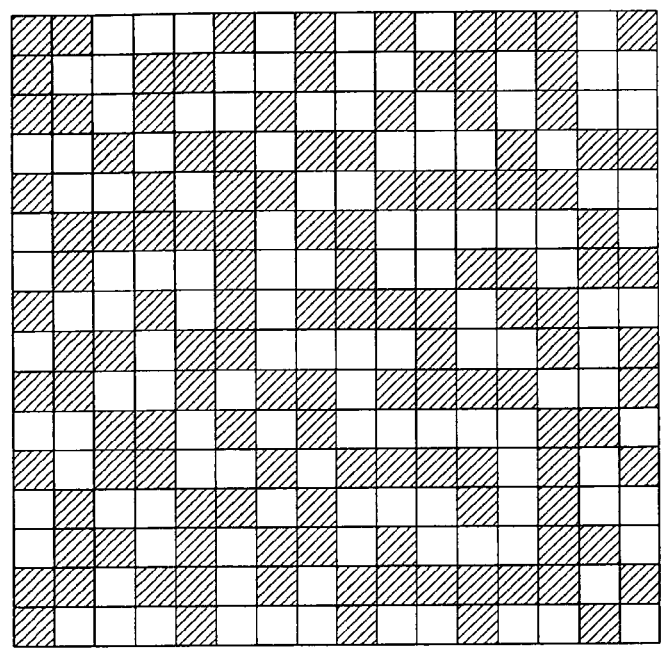
FIG. 8 is an illustrative diagram for explaining an example of a dot pattern (binary signal)
Figure 9:
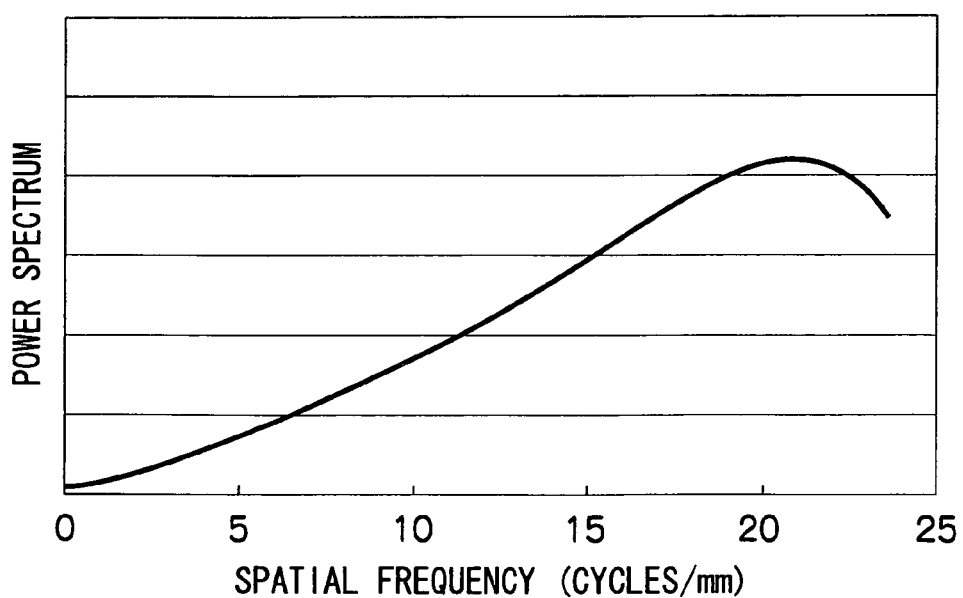
FIG. 9 is an illustrative diagram for describing blue noise characteristics.

FIG. 8 shows a further example of a binary signal obtained as a result of digital halftoning. As shown in FIG. 8, desirably, the dots to be deposited are dispersed. When a power spectrum is calculated by performing a discrete Fourier transform on the binary signal shown in FIG. 8, a graph such as that shown in FIG. 9 is obtained.

The binary signal shown in FIG. 8 has blue noise characteristics. More specifically, as shown in FIG. 9, the power is restricted to a small value in a spatial frequency range of 0 to 5 cycle/mm. The image formed on the recording medium in accordance with the binary signal having the blue noise characteristics shown in FIG. 9 does not create an impression of granularity to a human observer. Blue noise characteristics are described in more detail later.

When the dot pattern obtained on the basis of the threshold value matrix has blue noise characteristics, then the threshold value matrix is called a blue noise mask.

In the image forming apparatus 10, digital halftoning is carried out by using a blue noise mask. Furthermore, the image forming apparatus 10 carries out optimization processing with respect to the blue noise mask, in accordance with the nozzle droplet ejection characteristics, as described in more detail later, and when forming images on demand, it forms images of high quality at high speed, by using a previously optimized blue noise mask.

General R.A.P.S. and Blue Noise Characteristics

Before giving a detailed description of the optimization processing in the image forming apparatus 10 according to the present embodiment, the factors relating to this optimization processing (and in particular, R.A.P.S. and blue noise characteristics) will be described.

Figure 10:
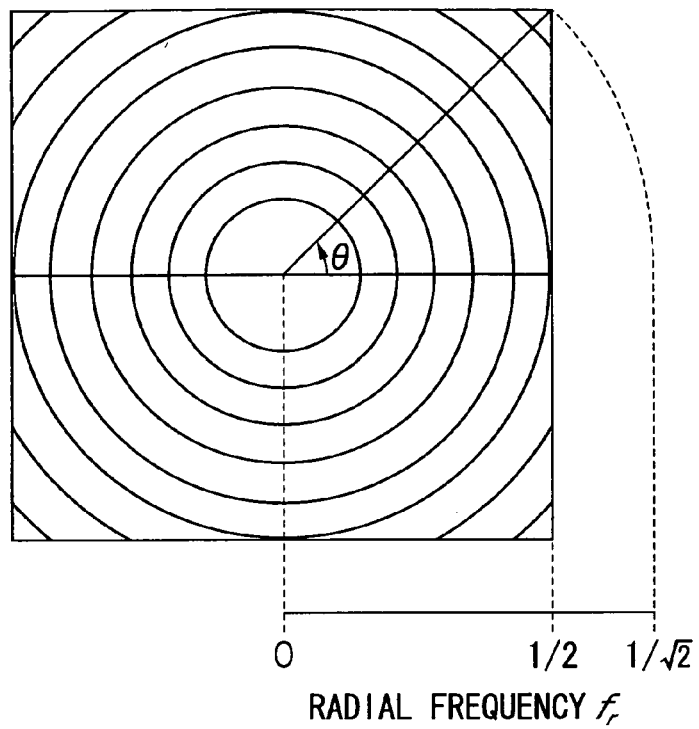
FIG. 10 is a diagram showing a radial coordinate system for indicating the average index of a radial-coordinate power spectrum (R.A.P.S.: Radially Averaged Power Spectrum)

The method proposed by Robert Ulichney is one known method for evaluating the dot pattern obtained as a result of digital halftoning ("Digital Halftoning", The MIT Press). More specifically, the power spectrum of the dot pattern is converted from a two-dimensional frequency coordinate system (fx, fy) to a radial coordinate system (fr, θ) as shown in FIG. 10, and the index corresponding to the average and dispersion of the spectrum at all angles (0°≦θ≦360°) is calculated for each spatial frequency fr in the radial coordinate system (fr, θ). The average index of the radial coordinate power spectrum is referred to as "radially averaged power spectrum (R.A.P.S.)", and the dispersion index is referred to as "anisotropy".

Figure 11:
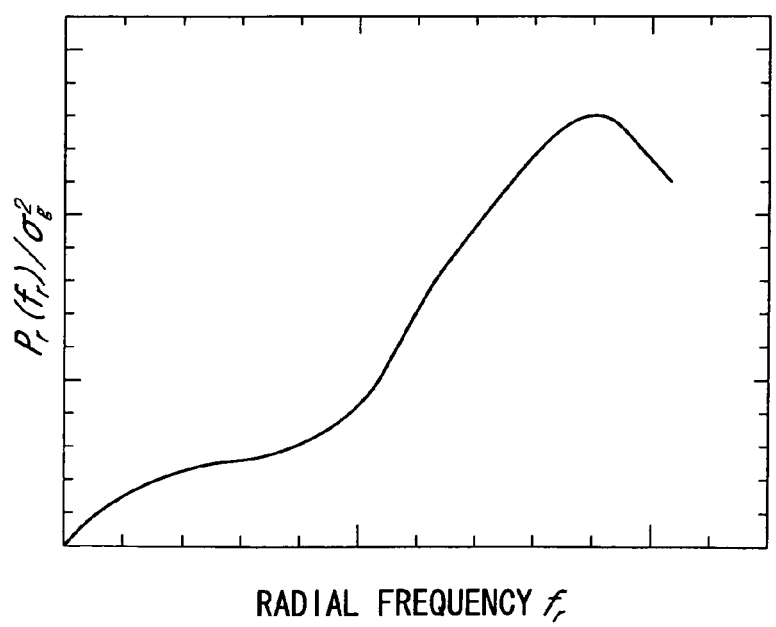
FIG. 11 is a graph showing an example of the R.A.P.S. calculated under certain conditions.
Figure 12:
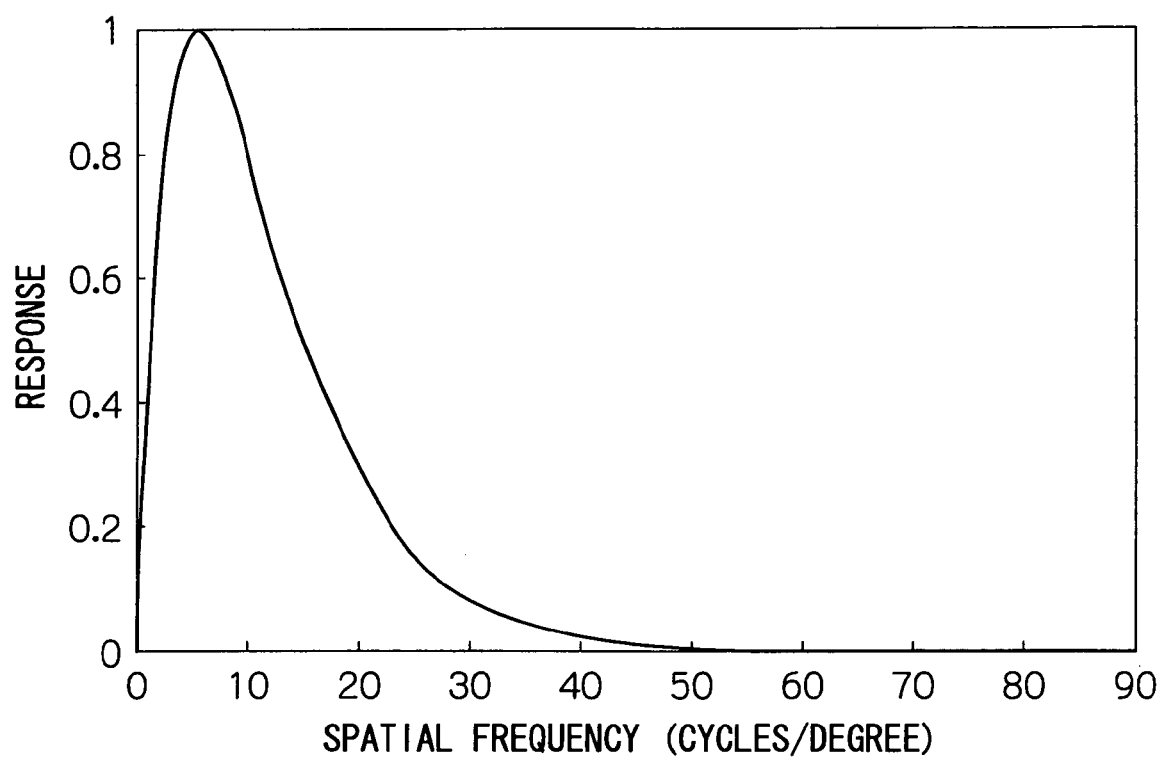
FIG. 12 is a graph showing an example of human visual characteristics (VTF: Visual Transfer Function)

FIG. 11 shows an example of the R.A.P.S. calculated under certain conditions. In general, the R.A.P.S. is used for image evaluation by taking into account (multiplying) the well-known visual characteristics (visual transfer function (VTF)) shown in FIG. 12.

Figure 13:
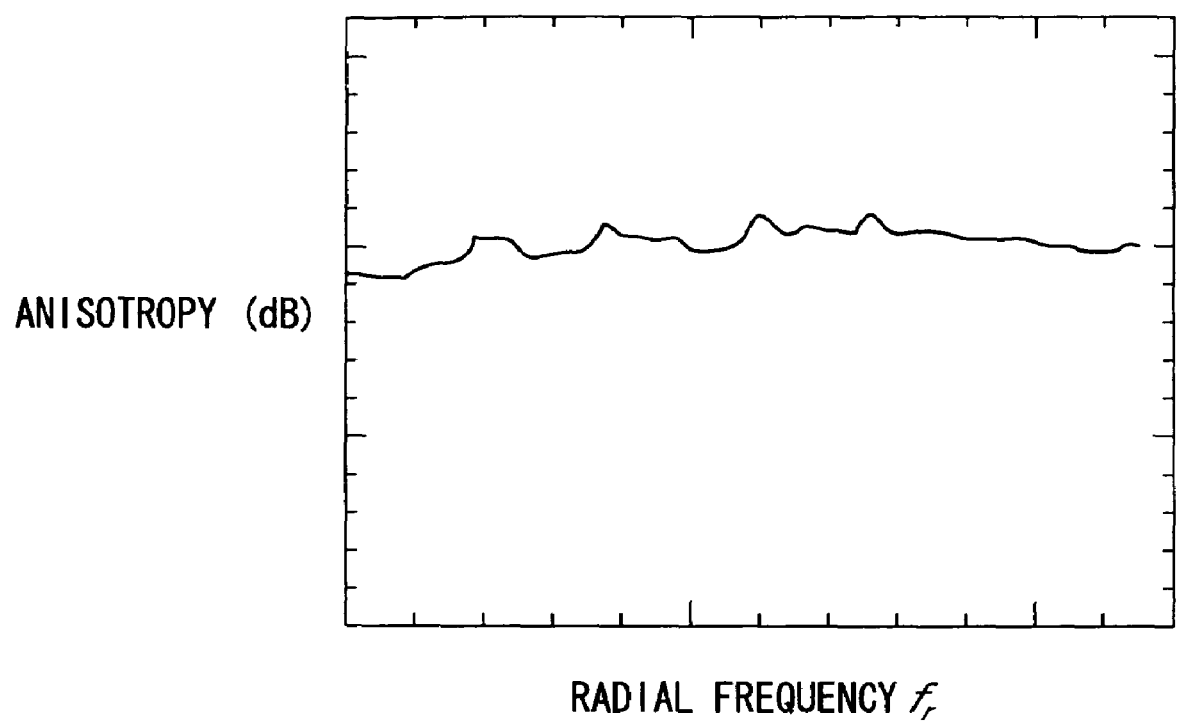
FIG. 13 is a graph showing an example of the anisotropy of the radial coordinate power spectrum calculated under certain conditions.

FIG. 13 shows an example of the anisotropy calculated under certain conditions. According to Robert Ulichney, the dot anisotropy ceases to be noticeable when the anisotropy is −10 decibels (dB) or less.

Figure 14:
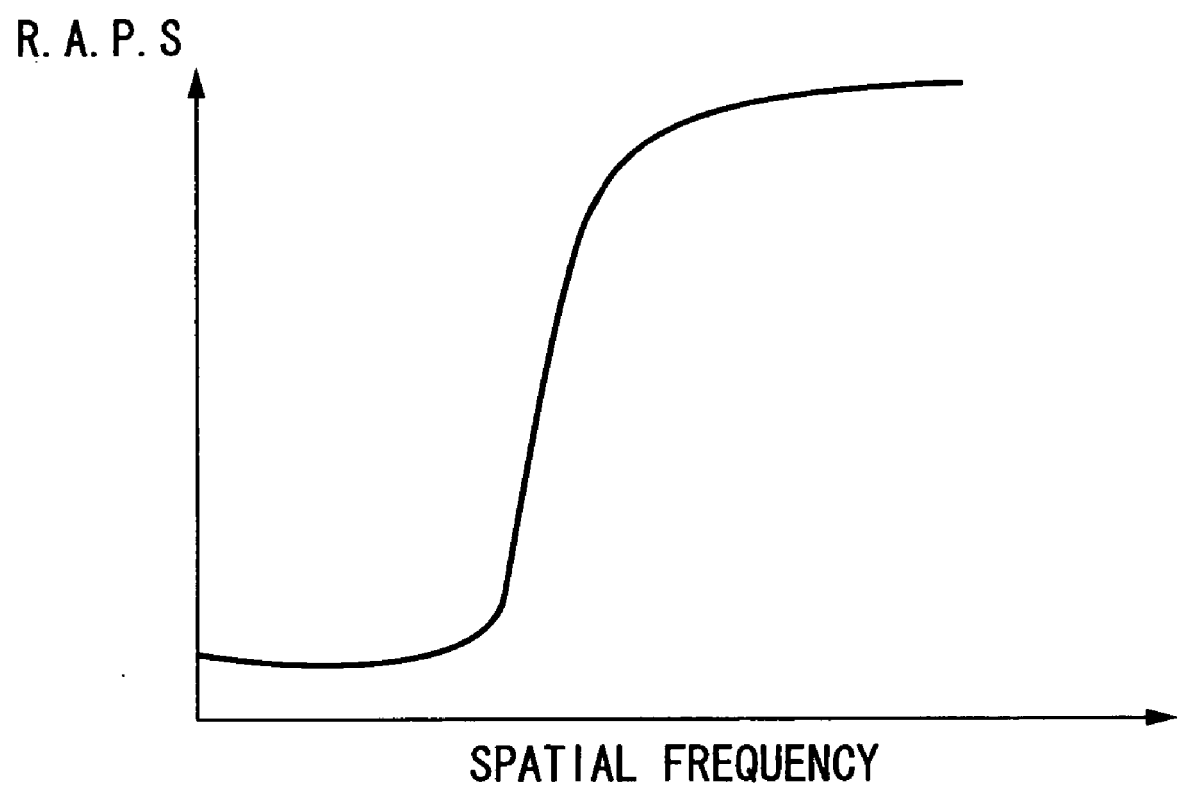
FIG. 14 is a graph showing a typical example of blue noise characteristics.

When the dot pattern is evaluated by using the indices described with reference to FIGS. 10 to 13, then in the case of a dot pattern having "blue noise characteristics", the R.A.P.S. is small in the low-frequency region where human perceptibility is higher, and the R.A.P.S. increases at higher frequencies. Furthermore, the anisotropy is generally equal to or less than −10 dB. The graph shown in FIG. 11 gives a general illustration of blue noise characteristics, and a graph of a typical example of blue noise characteristics is shown in FIG. 14.

Optimization Processing

The optimization processing in the image forming apparatus 10 according to the present embodiment is described in detail.

By performing optimization of the dot pattern, the image formed on the recording medium on the basis of this dot pattern is also optimized. However, in the present image forming apparatus 10, even if optimization processing is not carried out directly with respect to the dot pattern when forming images on demand, by previously carrying out optimization processing with respect to the threshold value matrix 160, and using this threshold value matrix 160 to indirectly optimize the dot pattern, it is possible to form good images, on demand, at high speed. This optimization is called "image optimization", "dot pattern optimization" or "threshold value matrix optimization".

Figure 15:
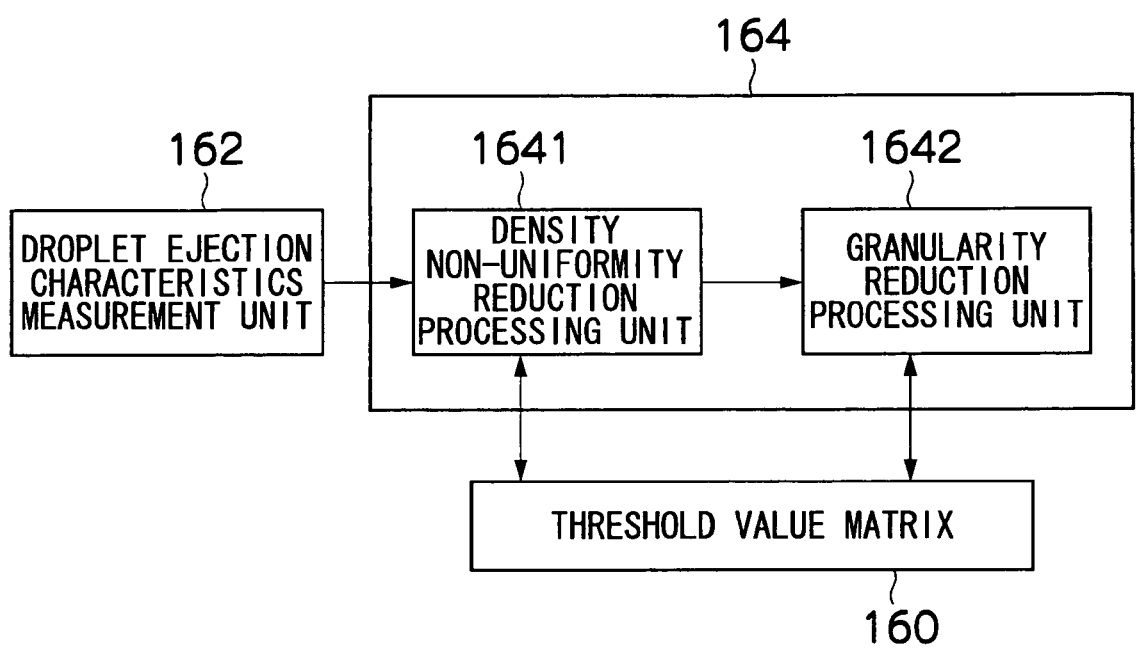
FIG. 15 is a principal block diagram showing the composition of an optimization processing unit.

FIG. 15 is a block diagram showing an optimization processing unit 164 and the elements relating to same.

In FIG. 15, the droplet ejection characteristics measurement unit 162 measures the droplet ejection characteristics for each nozzle 51.

The optimization processing unit 164 has a density non-uniformity reduction processing unit 1641 (first threshold value correction device) for correcting the threshold value matrix 160 on the basis of the droplet ejection characteristics for each nozzle 51, so as to reduce band-shaped density non-uniformities occurring in the image on a recording medium due to errors in the droplet ejection characteristics of the nozzles 51, and a granularity reduction processing unit 1642 (second threshold value correction device) for further correcting the threshold value matrix 160 which has been corrected in order to reduce density non-uniformities, on the basis of the threshold values in the threshold value matrix 160 (the threshold value matrix after density non-uniformity reduction processing), so as to reduce the granularity in the image on the recording medium.

Here, as an example of error in the droplet ejection characteristics of the nozzles 51, droplet ejection volume error, which is error in the volume of the ink droplet ejected from a nozzle 51, is described with reference to FIG. 16.

Figure 16:
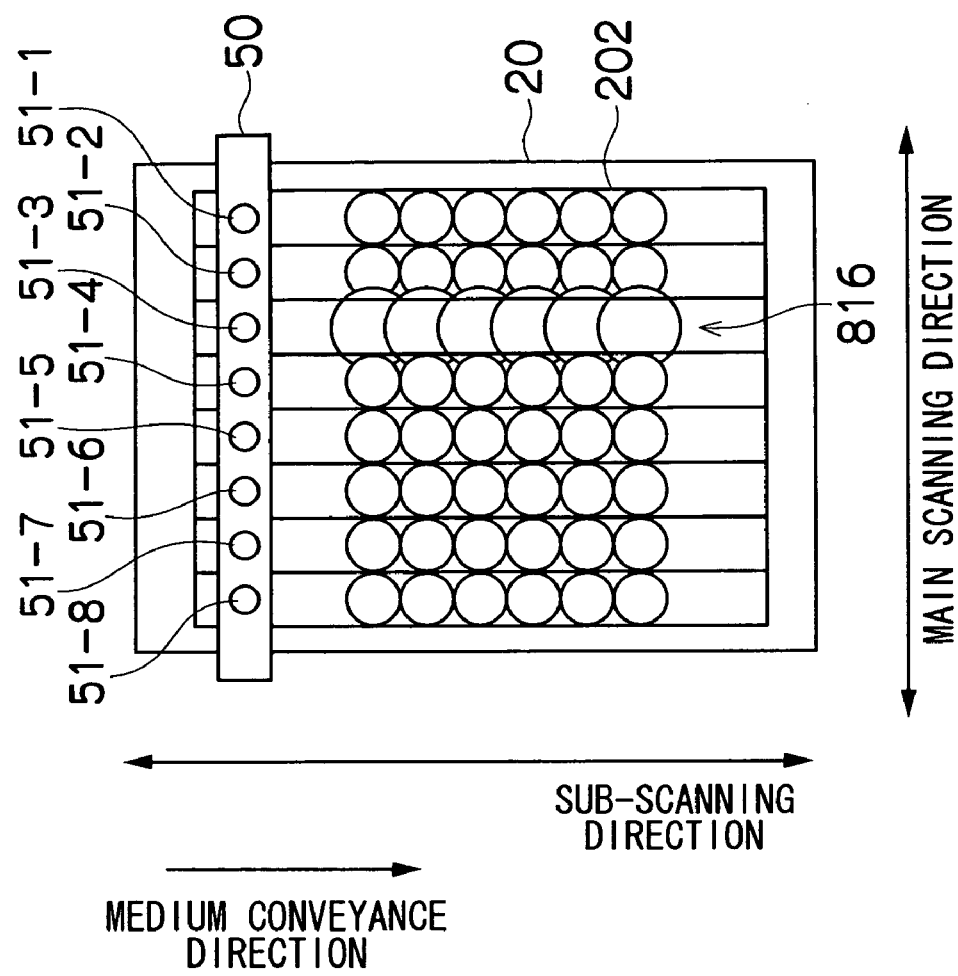
FIG. 16 is an illustrative diagram showing the relationship between nozzles and an image formed on a recording medium, in order to explain droplet ejection volume error in a nozzle.

In the inkjet head 50 shown in FIG. 16, eight nozzles 51-1 to 51-8 are arranged in sequence in the main scanning direction.

In order to simplify the description, the inkjet head 50 having one row and eight columns is described, but needless to say, in practice, the inkjet head 50 having a two-dimensional matrix configuration such as that shown in FIG. 2 may be used.

In the example shown in FIG. 16, of the eight nozzles 51-1 to 51-8, the nozzle 51-3 third from the right-hand side has error in the droplet ejection volume, and its droplet ejection volume is greater than that of the other nozzles 51-1, 51-2 and 51-4 to 51-8 which have ideal volumes. More specifically, the ink droplet ejected from the nozzle 51-3 has a large volume.

Taking a droplet ejection volume of an ideal nozzle to be V0, and the droplet ejection volume of a nozzle having a droplet ejection volume error v, to be V, then v=(V/V0)−1.

Due to the droplet ejection volume error v, in the image 202 formed on the recording medium 20 (depicting a solid image region, for example), a banding-shaped density non-uniformity 816 occurs in the sub-scanning direction, which is the medium conveyance direction.

In order to prevent the occurrence of density non-uniformity of this kind, desirably, the image forming apparatus 10 has a function for correcting the droplet ejection volume error v.

Next, as an embodiment of the measurement of the droplet ejection characteristics by the droplet ejection characteristics measurement unit 162, the measurement of the droplet ejection volume is described with reference to FIG. 17.

The droplet ejection characteristics measurement unit 162 comprises an optical sensor 1622 which determines the optical density of a test pattern image 204 formed on the recording medium. As shown in FIG. 17, the droplet ejection characteristics measurement unit 162 determines the optical density of the test pattern image 204 formed on the recording medium 20, while the optical sensor 1622 is moved successively through distances corresponding to the nozzle pitch, in the main scanning direction. The droplet ejection volume V and the droplet ejection error v of each nozzle 51 are calculated on the basis of the optical density determined by the optical sensor 1622 and a density profile stored previously in the print control memory 152.

Figure 17:
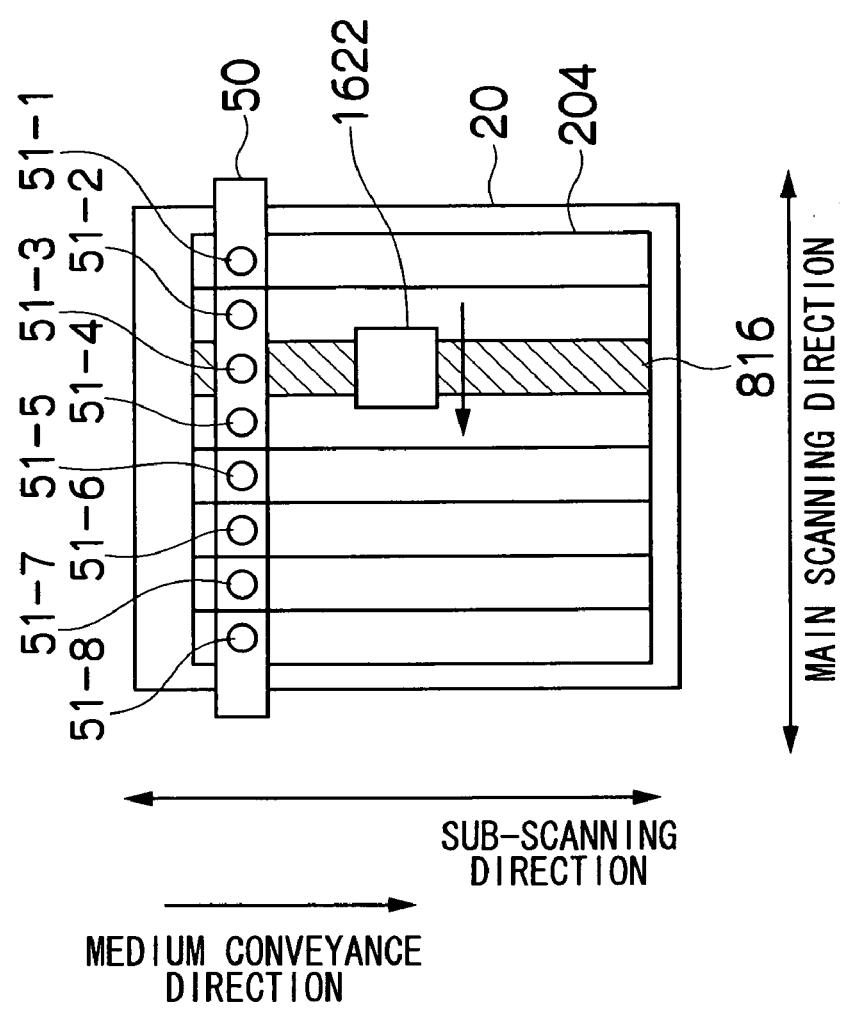
FIG. 17 is an illustrative diagram showing the relationship between nozzles and an optical sensor, in order to explain the measurement of the droplet ejection characteristics of the nozzles.

In the embodiment shown in FIG. 17, the nozzle 51-3 third from the right-hand side of the eight nozzles 51-1 to 51-8 has a greater droplet ejection volume than that of the other nozzles 51-1, 51-2 and 51-4 to 51-8 which have ideal volumes. When the optical density of the portion corresponding to the nozzle 51-3 is measured by the optical sensor 1622, the droplet ejection volume V and the droplet ejection volume error v of the nozzle 51-3 are calculated on the basis of the measured optical density and a density profile stored previously in the print control memory 152.

In order to simplify the description, a case is shown in which only one nozzle 51-3 has droplet ejection volume error, and the other nozzles have an ideal droplet ejection volume, but needless to say, there may also be cases where a plurality of nozzles 51 have droplet ejection volume error.

Next, threshold value correction (density non-uniformity reduction processing) for reducing density non-uniformity, as performed in the density non-uniformity reduction processing unit 1641, is described with reference to FIG. 18.

Figure 18:
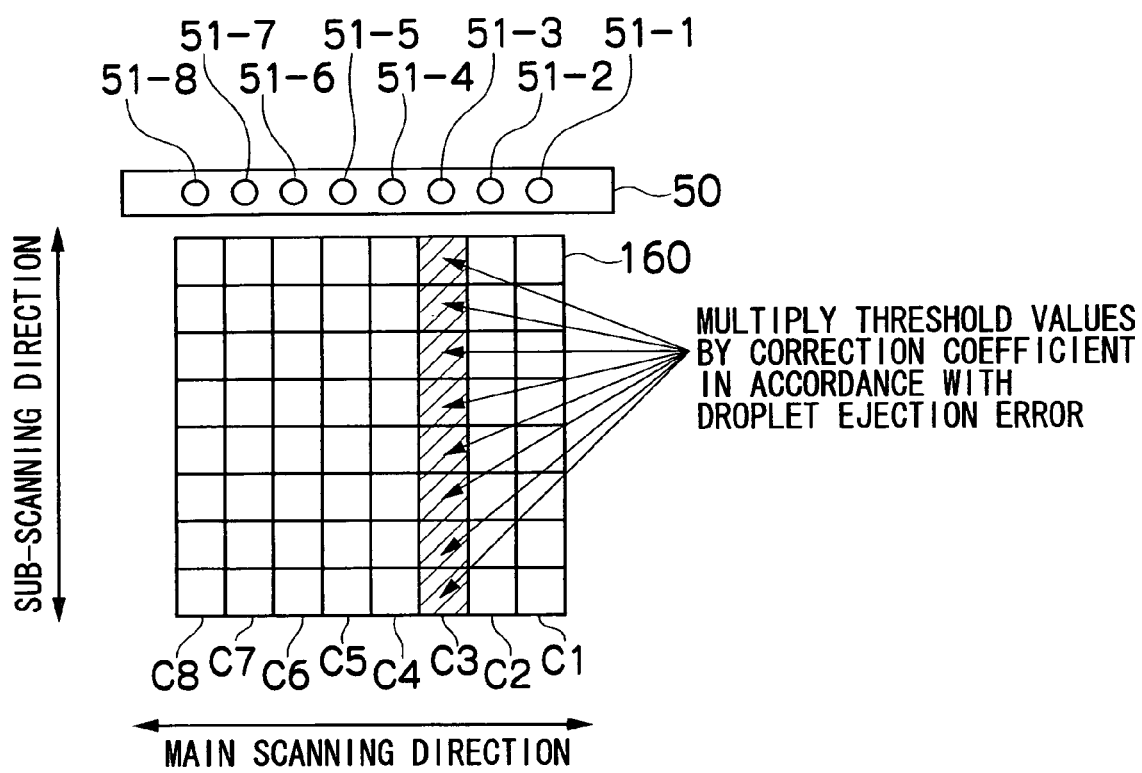
FIG. 18 is an illustrative diagram showing the relationship between the nozzles and a threshold value matrix, in order to explain density non-uniformity reduction processing.

FIG. 18 is a schematic drawing which shows the relationship between the nozzles 51 and threshold value matrix 160, in order to describe density non-uniformity reduction processing. The correction coefficient k=v+1 is multiplied by all of the threshold values that belong to the threshold value column corresponding to the nozzle 51-3 (the threshold value column C3 third from the right-hand side, of the threshold value columns C1 to C8 constituting the threshold value matrix 160 in FIG. 18) in the threshold value matrix 160, on the basis of the droplet ejection volume error v of the nozzle 51-3 measured by the droplet ejection characteristics determination unit 162 described above.

For example, if a nozzle has a droplet ejection volume of 1.1 times the droplet ejection volume of an ideal nozzle (i.e., droplet ejection volume error v=0.1), then a correction coefficient k (=1.1) is multiplied by the threshold value in the threshold value column corresponding to that nozzle. Accordingly, a similar effect is obtained to that of a case where 1/(v+1) is multiplied by the droplet ejection rate when forming an image on demand, thereby suppressing the occurrence of a density non-uniformity due to droplet ejection volume error in a nozzle.

Droplet ejection volume error, which is error in the volume of the ink droplet, is described as an example of droplet ejection error v, but it is also possible to carry out measurement and correction with respect to other droplet ejection errors, such as error in the landing positions of the ink droplets, by means of a concept similar to the measurement and correction of droplet ejection volume error. More specifically, the threshold values inside the threshold value matrix 160 are corrected on the basis of the measurement results of the droplet ejection characteristics measurement unit 162.

In the case of an ideal image forming apparatus which has absolutely no droplet ejection error in the nozzles 51, a reference threshold value matrix (blue noise mask) that generates a dot pattern having blue noise characteristics such as that in FIG. 9 is used directly for on-demand image formation, without correction.

On the other hand, in a general image forming apparatus 10 having droplet ejection error in the nozzles 51, the dot pattern obtained on the basis of the threshold value matrix 160 as a result of performing density non-uniformity reduction processing on the threshold value matrix 160 has characteristics (shown in FIG. 19) which are generally degraded with respect to ideal characteristics (the blue noise characteristics shown in FIG. 9).

Figure 19:
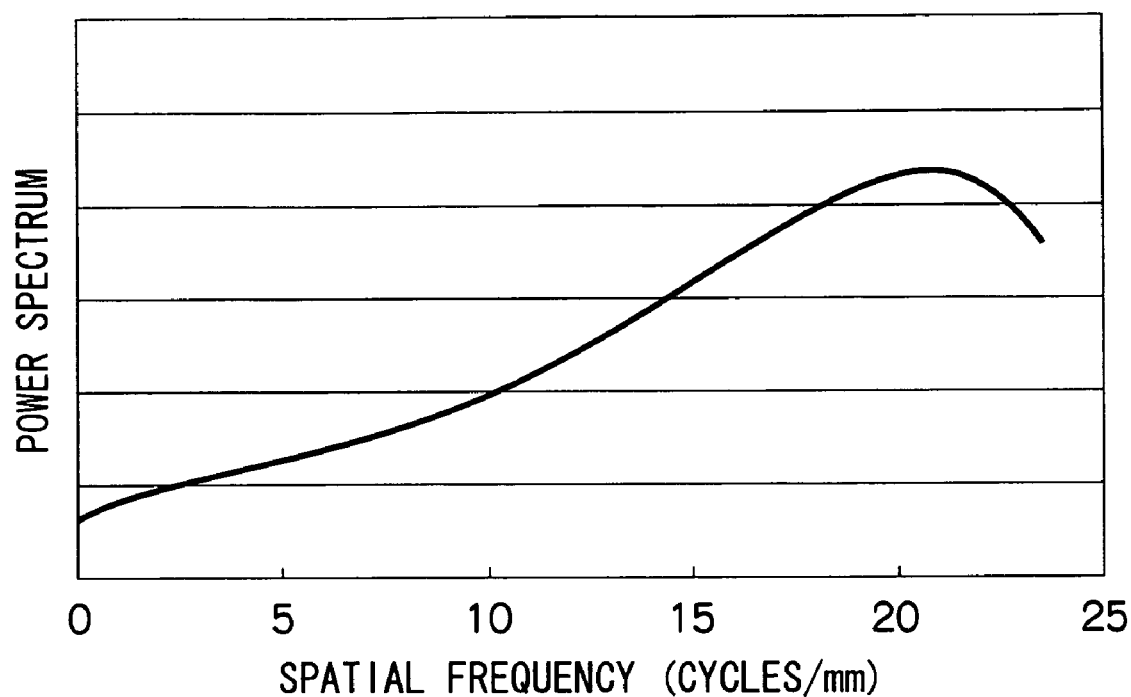
FIG. 19 is a graph showing the dot pattern characteristics obtained using a threshold value matrix directly after a density non-uniformity correction processing, in order to explain reduction in granularity arising from density non-uniformity reduction processing.

In the graph shown in FIG. 19, due to the density non-uniformity reduction processing, the power rises in the frequency band where granularity is particularly noticeable to a human observer (principally, 0 to 5 cycle/mm). This means that the granularity of the image formed on the recording medium worsens (becomes greater).

Therefore, correction for reducing granularity is performed by the granularity reduction processing unit 1642, while maintaining the accuracy of the density non-uniformity reduction, with respect to the threshold value matrix 160 that has been corrected in order to reduce density non-uniformities by the density non-uniformity reduction processing unit 1641.

The threshold value correction (granularity reduction processing) for reducing granularity performed by the granularity reduction processing unit 1642 is described with reference to FIGS. 20 and 21.

Figure 20:
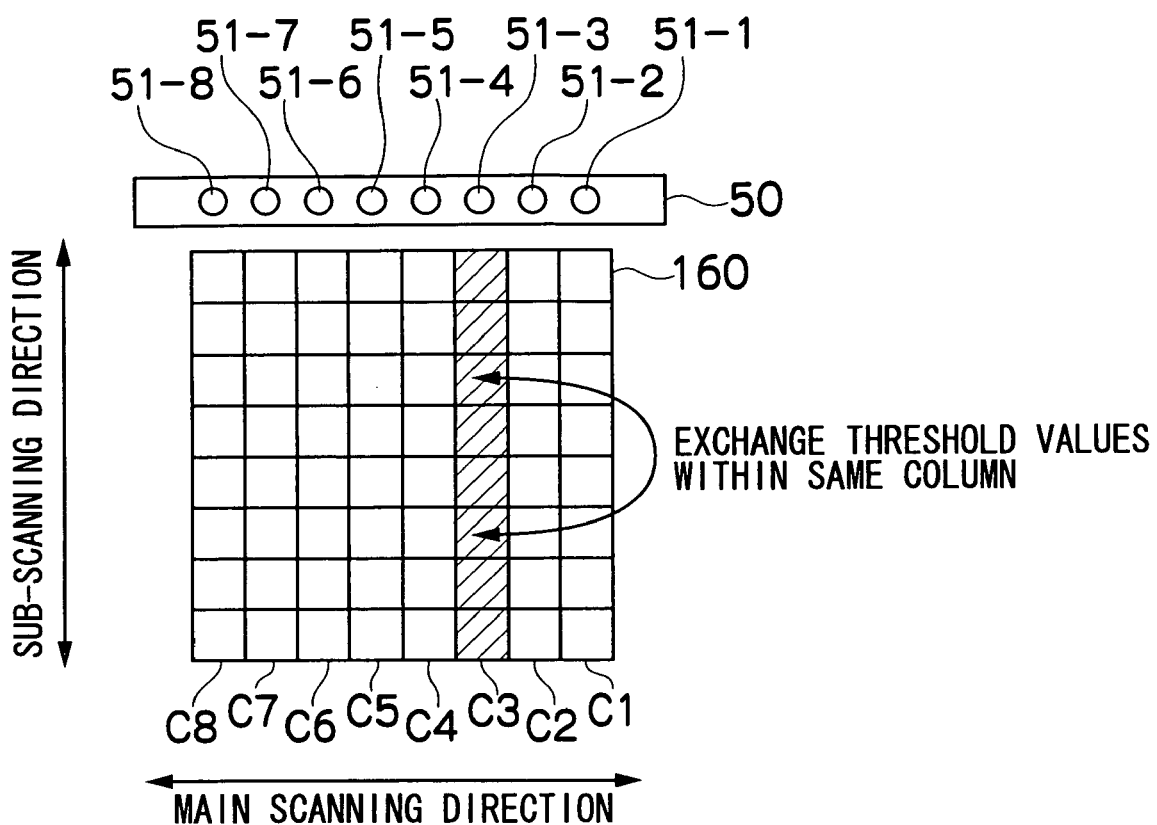
FIG. 20 is an illustrative diagram showing the relationship between the nozzles and a threshold value matrix, in order to explain granularity reduction processing.

FIG. 20 shows the threshold value matrix 160 having eight rows by eight columns. The eight threshold value columns (C1 to C8) correspond respectively to the eight nozzles (51-1 to 51-8). In order to simplify the description, the threshold value matrix 160 having eight rows and eight columns is described, but in actual practice, a threshold value matrix (for example, 256×256) larger than this is used.

Looking specifically at one particular nozzle 51, exchange between threshold values is only permitted within the same threshold value column that corresponds to the nozzle 51 in question.

For example, looking specifically at the nozzle 51-3 in FIG. 20, threshold values are only exchanged within the threshold value column corresponding to the nozzle 51-3 in question (in other words, the threshold value column C3 in FIG. 20).

Consequently, the granularity can be reduced while maintaining the accuracy of the density non-uniformity reduction provided by the density non-uniformity reduction processing unit 1642.

The granularity index G relating to the threshold value matrix 160 before and after exchange of the threshold values is calculated by means of the following Formulas (1) and (2):

$$P(f_x,f_y)=|\int\int M(x,y)e^{-i(f_x x+f_y y)}dxdy|, \quad (1)$$

where M represents the threshold value matrix, and M(x, y) indicates each threshold value in this matrix; i is the imaginary unit; (fx, fy) is a two-dimensional frequency coordinate system which represents the power spectrum for the threshold value matrix M; P represents the power spectrum of the threshold value matrix M; and $P(f_x, f_y)$ indicates each power value in the two-dimensional frequency coordinate system $(f_x, f_y)$, and $$G = \int_{f_r>0} df_r VTF(f_r) \int_{f_\theta \in \Theta} df_\theta P(f_x, f_y), \quad (2)$$

where $(f_r, f_\theta)$ is a radial coordinate system corresponding to the two-dimensional frequency coordinate system $(f_x, f_y)$; $\Theta$ indicates the range of $f_\theta$ when the power spectrum P is integrated with respect to the threshold value M; VTF indicates the visual characteristics of a human eye with respect to the frequency.

As shown in Formulas (1) and (2), the granularity index G is basically obtained by integrating the power spectrum P for the threshold value matrix M within a prescribed integration range, in the radial coordinate system $(f_r, f_\theta)$. In other words, the granularity index G is an indicator specified by using the R.A.P.S. of the threshold value matrix M.

When calculating the R.A.P.S. for a dot pattern in the related art, the integration range is taken to cover all the angles $(0° \leq f_\theta \leq 360°)$. On the other hand, in the image forming apparatus 10 according to the present embodiment, if the R.A.P.S. of the threshold value matrix M is to be calculated as the granularity index G, then the integration range $\Theta$ is taken to be $\theta_0 < f_\theta < 180° - \theta_0$, and $180° + \theta_0 < f_\theta < 360° - \theta_0$ as shown Here, $\theta_0$ is an angle limiting the integration range of the power in the radial coordinate system when calculating the R.A.P.S. This angle specifies the range of the power values that are excluded in order to achieve a granularity reduction function in the threshold value matrix 160, while maintaining the accuracy of density non-uniformity correction in the threshold value matrix 160.

More specifically, if the frequency coordinate axis $f_y$ corresponds to the y axis, which is the direction in which one-dimensional density non-uniformity occurs (the conveyance direction of the recording medium), then in general, a high power value caused by the density non-uniformity reduction processing (a density non-uniformity correction component) appears on the other frequency coordinate axis $f_x$, which is perpendicular to the $f_y$ axis, and in the vicinity of the axis $f_x$. Therefore, the density non-uniformity correction component is excluded from the integration operation by means of the angle $\theta_0$.

The reason for this is that the density non-uniformity correction component described above appears because the threshold value matrix 160 has a density non-uniformity correction function, and there is no need to reduce this component in the threshold value matrix 160, whereas the actual non-uniform component appearing in the regions apart from those excluded by means of the angle $\theta_0$ is perceived as granularity when the image is formed.

Figure 21:
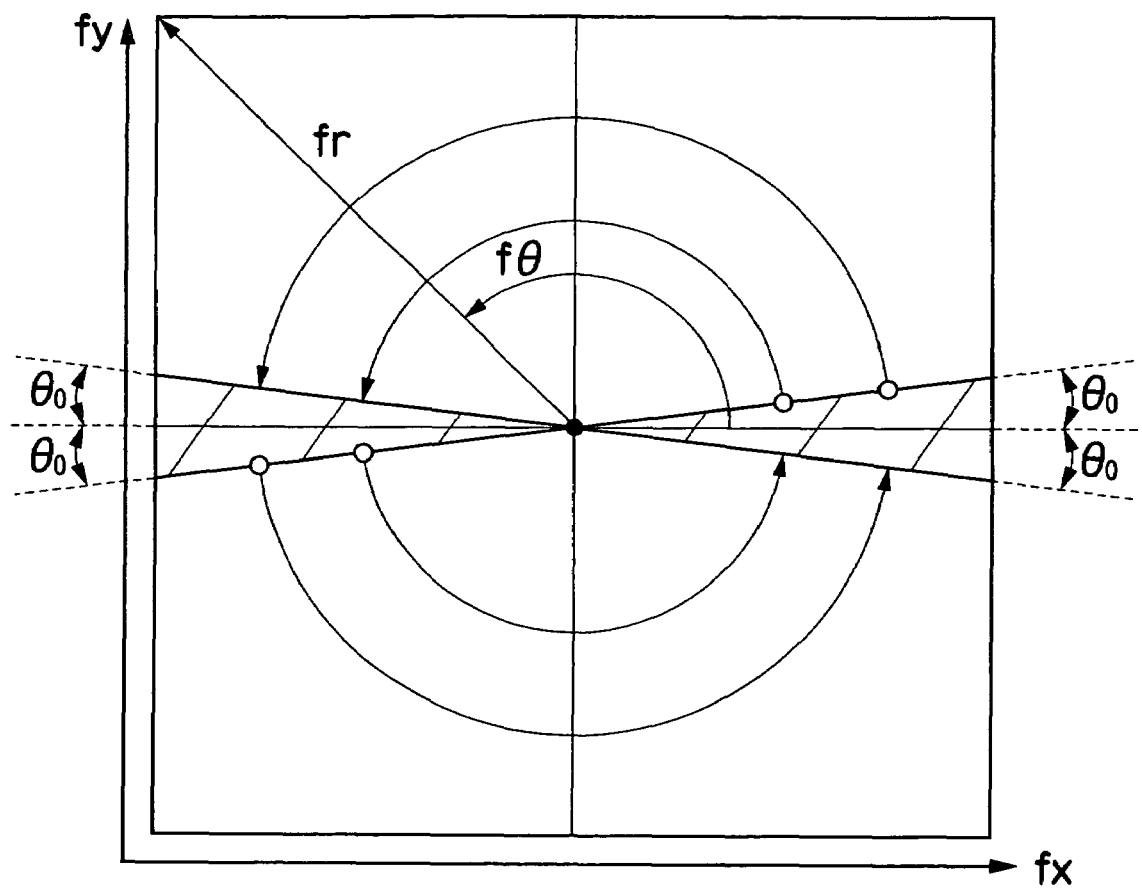
FIG. 21 is an illustrative diagram for describing the integration range of the power spectrum of a threshold value matrix, when calculating the granularity index.

In the embodiment in FIG. 21, the R.A.P.S. of the threshold value matrix is calculated by excluding the power in the range indicated by the diagonal shading from the integration operation.

The calculated R.A.P.S. of the threshold value matrix is weighted with the visual characteristics of a human eye, VTF. The R.A.P.S. weighted with the VTF specifies the granularity index G.

Figure 22:
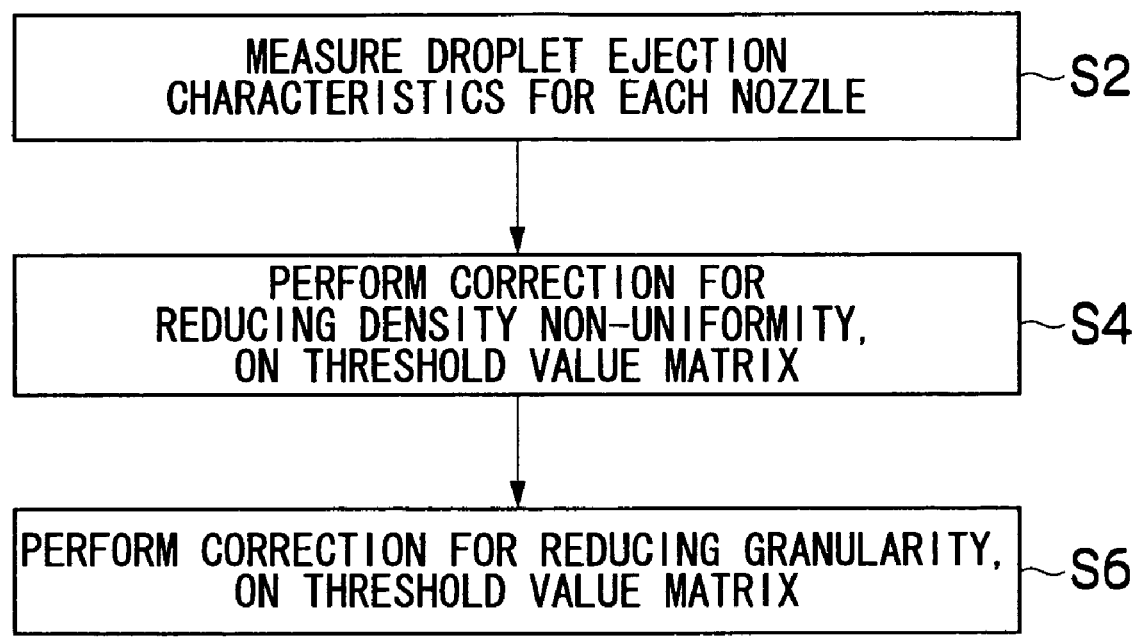
FIG. 22 is a general flowchart showing the overall sequence of optimization processing.

FIG. 22 is a flowchart showing the sequence of optimization processing for the threshold value matrix. This optimization processing is carried out in accordance with a prescribed program, by means of a microcomputer which constitutes a portion of the optimization processing unit shown in FIG. 1.

In FIG. 22, firstly, the droplet ejection characteristics for each nozzle are measured (S2).

More specifically, a test pattern image is formed on the recording medium while moving the inkjet head 50 and the recording medium relatively with respect to each other in the sub-scanning direction. As shown in FIG. 17, the optical density of the test pattern image 204 formed on the recording medium 20 is then measured while moving the optical sensor 1622 facing the image forming surface of the recording medium 20 successively through the nozzle pitch in the main scanning direction. The droplet ejection volume V and the droplet ejection error v of each nozzle 51 are calculated on the basis of the optical density thus measured and a density profile stored previously in the print control memory 152.

Next, correction for reducing density non-uniformity is carried out with respect to the reference threshold value matrix set as a blue noise mask, on the basis of the droplet ejection error v (or the droplet ejection volume V) for each nozzle 51 thus determined (S4).

More specifically, as shown in FIG. 18, if the threshold value column corresponding to a nozzle 51 having a droplet ejection error v ($\neq 0$) is specifically considered, from among the plurality of threshold value columns constituting the threshold value matrix 160, then all of the threshold values in the threshold value column under consideration are multiplied by the correction coefficient (v+1) corresponding to the droplet ejection error v of the nozzle.

Thereupon, the threshold value matrix that has undergone processing for reducing density non-uniformity is subjected to correction for reducing the granularity, while maintaining the accuracy of the density non-uniformity correction (S6).

Figure 23:
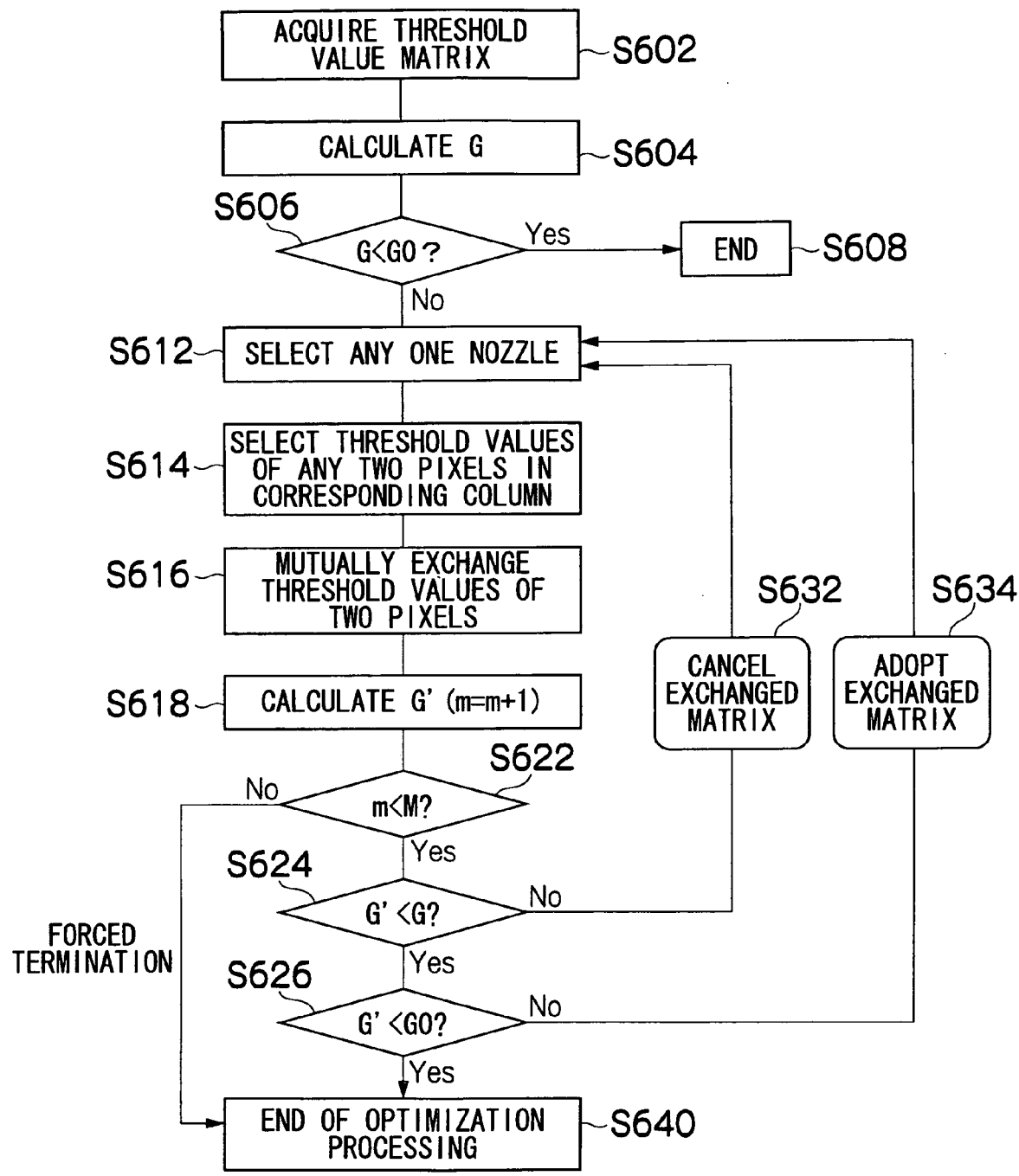
FIG. 23 is a flowchart showing a sequence of granularity reduction processing.

FIG. 23 is a flowchart showing the detailed sequence of granularity reduction processing in step S6 in FIG. 22.

In FIG. 23, firstly, the threshold value matrix 160 after the density non-uniformity correction is acquired (S602).

Thereupon, the granularity index G as expressed by the above-described Formulas (1) and (2) is calculated for the threshold value matrix 160 after the density non-uniformity correction (S604).

Next, the granularity index G thus calculated is compared with a target value G0 of the granularity index previously stored in the print control memory 152 (S606), and if the calculated granularity index G is smaller than the target value G0, then this means that the granularity of the dot pattern to be formed in the future on the basis of the threshold value matrix 160 is sufficiently low (in other words, the granularity of the image to be formed in future on the recording medium is sufficiently low), and hence correction of the threshold value matrix is judged to be unnecessary and the granularity reduction processing terminates without performing additional correction of the threshold value matrix 160 (S608).

If, on the other hand, the calculated granularity index G is equal to or greater than the target value G0, then correction for reducing the granularity is carried out with respect to the threshold value matrix 160.

Then, any one nozzle (nozzle under consideration) is selected (S612).

Thereupon, looking specifically at the threshold value column corresponding to the nozzle under consideration, of the threshold value columns in the threshold value matrix, the threshold values of any two pixels in the threshold value column under consideration are selected (S614), and the threshold values of the selected two pixels are exchanged for each other (S616).

For example, as shown in FIG. 20, looking specifically at the nozzle 51-3, the two threshold values of two pixels are selected and exchanged in the threshold value column corresponding to the nozzle 51-3 under consideration (i.e., the threshold value column C3 in FIG. 20).

Thereupon, a granularity index G' as expressed by Formulas (1) and (2) is calculated for the threshold value matrix 160 after this threshold value exchange (S618).

The number of exchange judgment operations, m, is reset to "0" at the start of the granularity reduction processing, and it is then incremented by 1, each time that threshold values are exchanged and a granularity index G' is calculated.

It is judged whether or not the number of exchange judgment operations, m, has reached an upper limit M (S622), and if it has reached this upper limit M, then the granularity reduction processing is forced to terminate (S640). This is because there is a possibility that the granularity index may not converge, depending on the setting of the target value G0.

If the number m is less than the limit M at step S622, then the granularity index G just after the density non-uniformity correction and the granularity index G' after the threshold value exchange are compared with each other (S624), and if G'<G then the granularity index G' after the threshold value exchange is compared with the target value G0 (S626).

If G'<G and G'<G0, then the dot pattern to be formed in the future on the basis of the corrected threshold value matrix will have sufficiently low granularity (in other words, the image formed in the future on the recording medium will have sufficiently low granularity), and therefore, the threshold value matrix is taken to be an optimized matrix and the granularity reduction processing terminates (S640).

If G' is not less than G, the threshold value matrix having the exchanged threshold values is cancelled (S632), whereas if G' is less than G but G' is not less than G0, then the threshold value matrix after the threshold value substitution is adopted (S634). Then, the steps of nozzle selection (S612), threshold value selection (S614), threshold value exchange (S616), and granularity index calculation (S618) are repeated, as long as the number of exchange judgment operations, m, is less than the upper limit M, and if the conditions G'<G and G'<G0 are satisfied, then the threshold value matrix is taken to be an optimized matrix and the granularity reduction processing terminates (S640).

Division Processing

In general, a two-dimensional fast Fourier transform (2dFFT) is performed to calculate the R.A.P.S. of the threshold value matrix, as the granularity index G in the optimization processing described above. Supposing that the size of the threshold value matrix is "Nh" pixels in height by "Nw" pixels in width, then the calculation time of the two-dimensional fast Fourier transform is directly proportional to Nh×Nw×log (Nh)×log (Nw).

Therefore, if the threshold value matrix is large in size, a very long calculation time is generally required if the calculation is performed for the whole of the threshold value matrix.

Therefore, by dividing the threshold value matrix into a plurality of areas, and carrying out correction for reducing granularity in each of the divided areas, it is possible to speed up the optimization processing for the whole threshold value matrix.

This divided optimization processing is carried out by the granularity reduction processing unit 1642 of the optimization processing unit 164 shown in FIG. 15.

Since the droplet ejection characteristics generally vary between the nozzles, the divided optimization processing yields different threshold value matrices for the divided areas.

Figure 25:
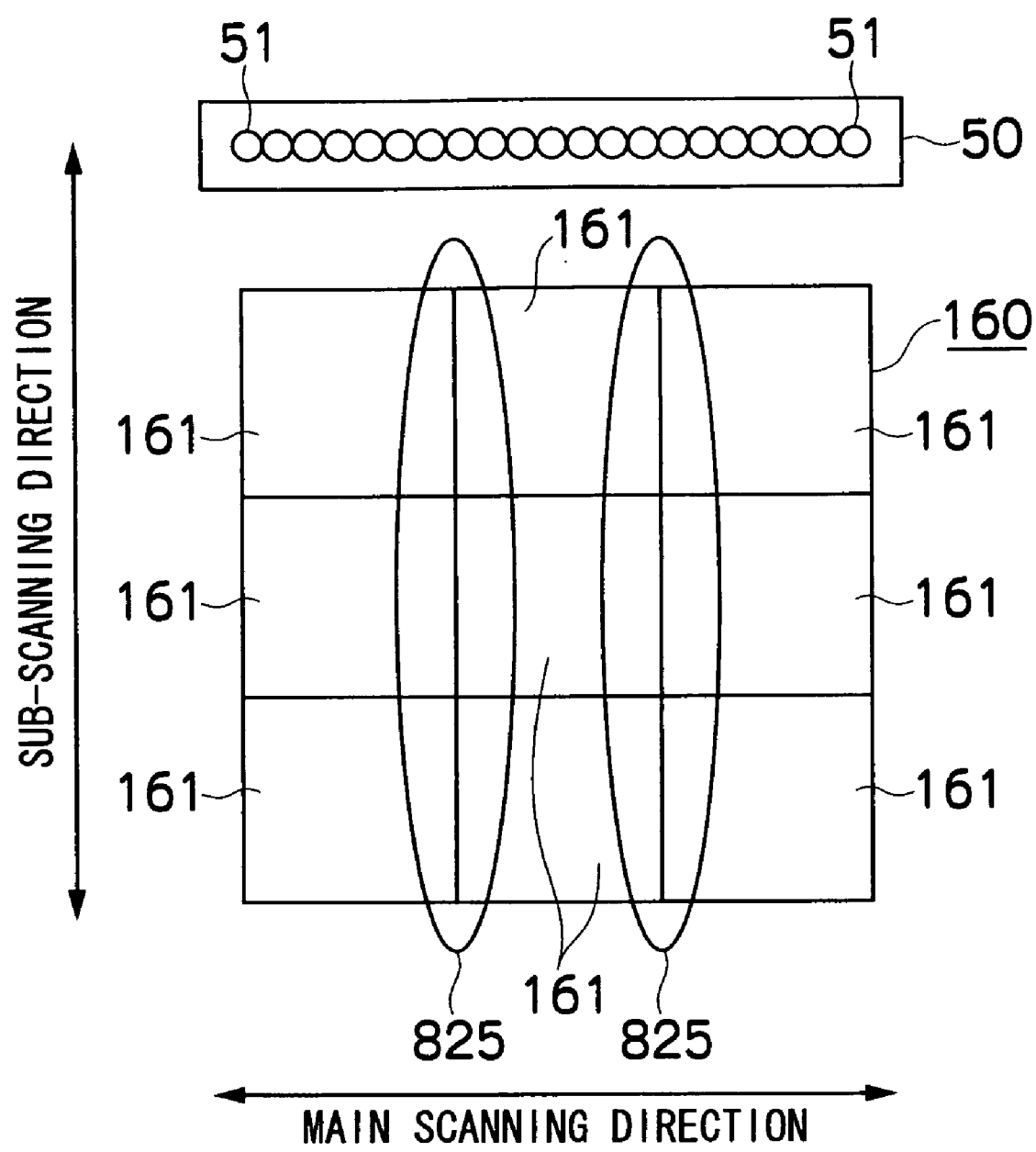
FIG. 25 is an illustrative diagram for describing a case where divided areas are not made to overlap with each other, when the threshold value matrix is divided up.

For example, in a simple area division shown in FIG. 25, matching between the threshold values of the divided areas 161 is not guaranteed, particularly in the boundary regions 825 of the divided areas 161, and the granularity may become worse locally, and texture corresponding to the size of the divided areas 161 may become visible in some cases.

Figure 26:
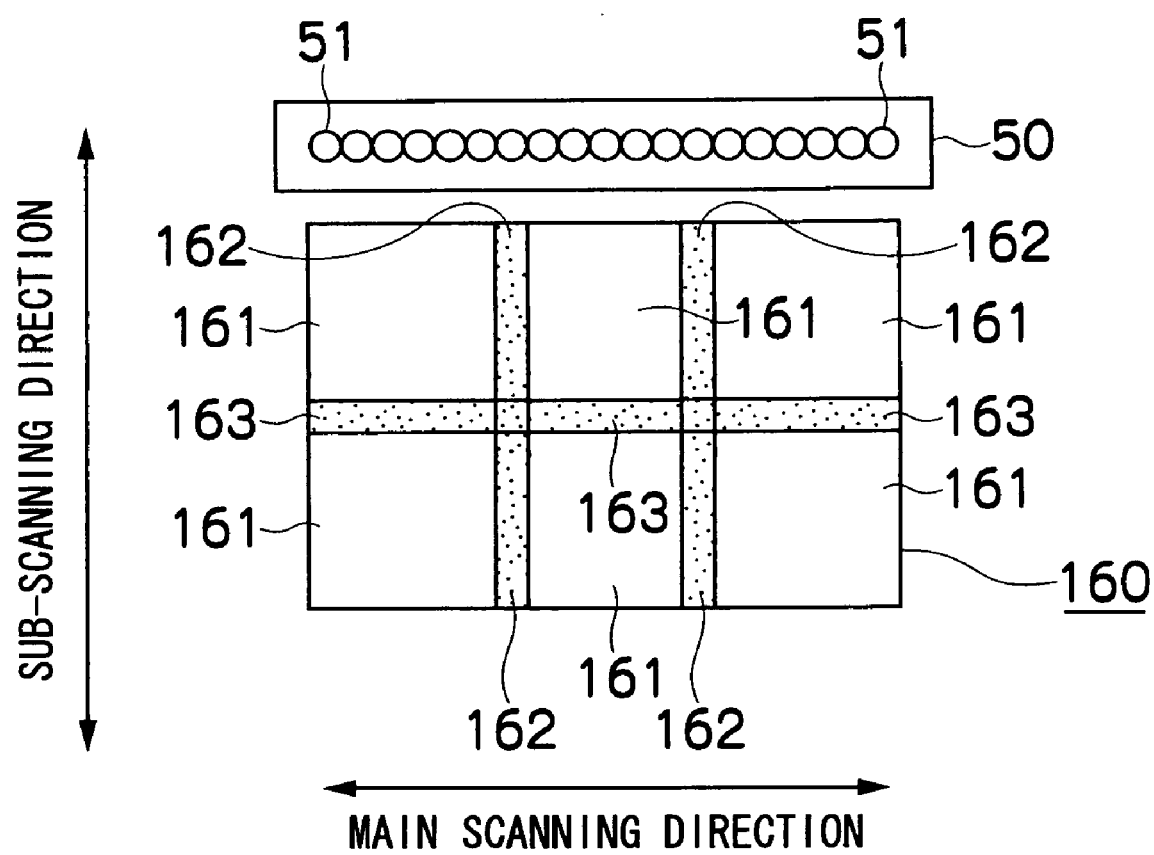
FIG. 26 is an illustrative diagram for describing a case where divided areas are made to overlap partially with each other, when the threshold value matrix is divided up.

Therefore, as shown in FIG. 26, the threshold value matrix is divided into areas in such a manner that the divided areas 161 overlap partially with each other. In other words, the divided areas 161 share overlap sections 162 and 163 with the adjacent divided areas 161.

Desirably, priority is given to the nozzle row direction (main scanning direction) in the setting of the overlap sections 162 and 163 and the optimization processing for each divided area 161.

For example, the overlap section 163 is not provided in the conveyance direction of the recording medium (the sub-scanning direction), and the overlap sections 162 are provided in the main scanning direction by periodically positioning the same divided threshold value matrices (in other words, the divided areas 161).

This is because, there is no occurrence of locality, such as droplet ejection error of a certain nozzle 51, in the recording paper conveyance direction, and in general, problems of degraded image quality due to correction of density non-uniformity or problems of mismatching between the divided areas 161 can be ignored in the conveyance direction of the recording medium.

The divided optimization processing that makes it possible to ensure matching between the divided areas is described with reference to FIG. 27.

Figure 27:
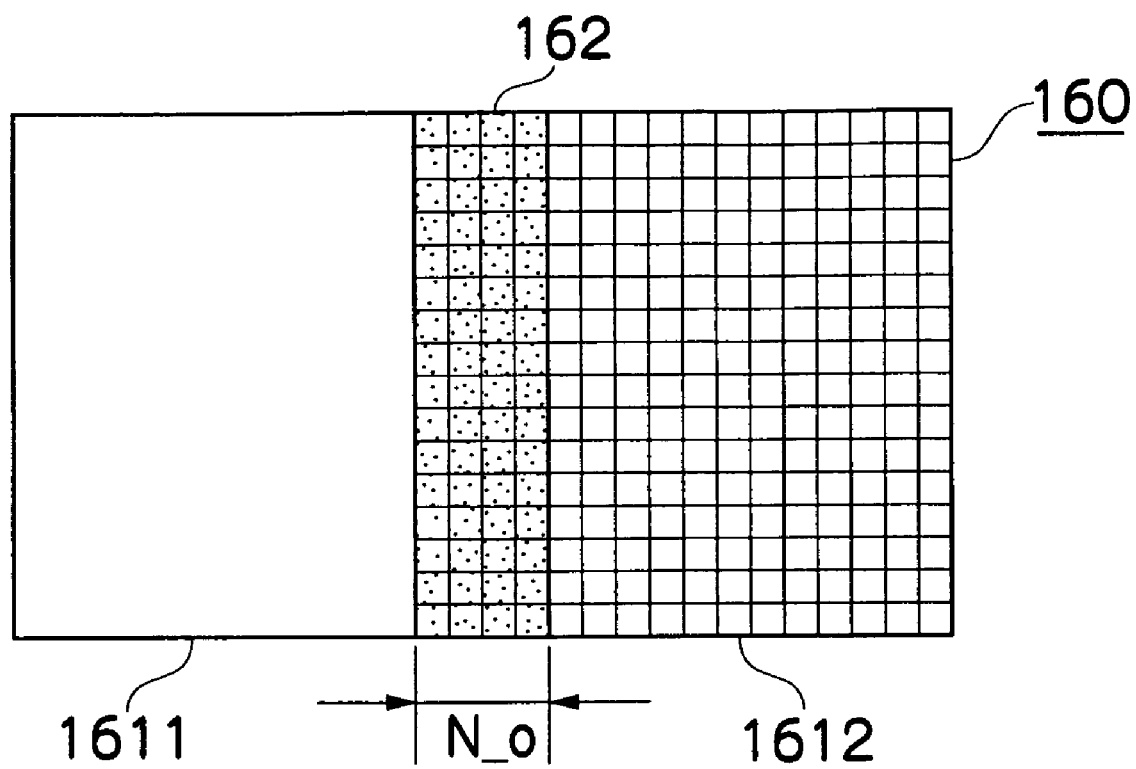
FIG. 27 is an illustrative diagram for describing granularity reduction processing which takes account of overlapping.

FIG. 27 shows only two divided areas of the whole threshold value matrix 160, namely, a first divided area 1611, and a second divided area 1612, which overlaps partially with the first divided area 1611.

Firstly, correction of the threshold values in order to reduce granularity, as described above on the basis of the flowchart in FIG. 23, is carried out with respect to the first divided area 1611, whereupon similar processing is carried out with respect to the second divided area 1612.

Here, the overlap section 162 between the divided areas is an exchange-prohibited region in which the exchange of threshold values is prohibited.

More specifically, when exchanging the threshold values in the first divided area 1611, exchange of threshold values in the overlap section is permitted, and hence the threshold values may be exchanged in this overlap section 162 as well. In the threshold value correction processing of the other divided area (in this case, the second divided area 1612), exchange of the threshold values in the overlap section 162 is prohibited, and therefore the threshold values in the overlap section 162 are not exchanged.

On the other hand, when evaluating the granularity of each of the first divided area 1611 and the second divided area 1612, the granularity is evaluated by calculating the granularity index value G for each divided area including the overlap section 162 in each case.

By means of processing of this kind, it is possible to reduce granularity while preserving matching between the divided areas 161.

It is possible that optimal values are set in advance for the number of overlapping pixels, N_o and the number of exchange-prohibited pixels, N_p.

Figure 24:
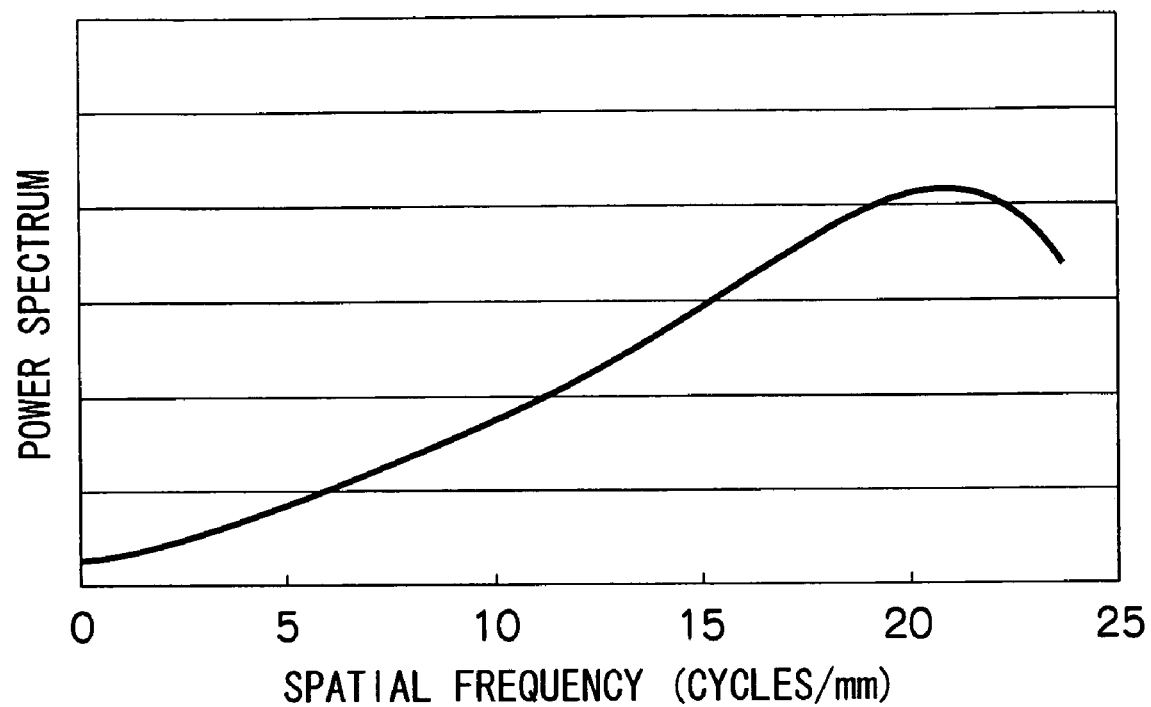
FIG. 24 is a graph showing blue noise characteristics restored by means of granularity reduction processing.

By means of the processing described above, blue noise characteristics are restored, as shown in FIG. 24.

Here, the embodiments are described in which the droplet ejection volumes are measured as the droplet ejection characteristics (ejection characteristics), but the present invention is not limited to a case of reducing density non-uniformities due to errors in the droplet ejection volume, and needless to say, it also includes cases of reducing density non-uniformities caused by other droplet ejection characteristics. For example, density non-uniformities arising from errors in the landing positions of the ink droplets are reduced.

Furthermore, in the above-described embodiments, the droplet ejection characteristics are determined by using a measurement function provided in the image forming apparatus, but the present invention may also be applied to a case where the droplet ejection characteristics are determined on the basis of the measurement results of a device separate from the image forming apparatus. For example, the droplet ejection characteristics may be determined on the basis of the results of reading in the images of respective apparatuses by means of a separate scanner. Furthermore, it is also possible to determine the droplet ejection characteristics by acquiring data indicating the droplet ejection characteristics for respective apparatuses, from a host computer, or the like, by means of communications.

Furthermore, in the above-described embodiments, the binary signal is generated in the form of the dot pattern by means of half-toning using the threshold value matrix, but the present invention may of course also be applied to a case where a multiple-value signal is generated instead of a binary signal (for example, a signal representing the droplet ejection volume, rather than simply representing whether or not a droplet is to be ejected).

Furthermore, in the above-described embodiments, RGB data is input to the image forming apparatus and converted into CMYK data, but the present invention is not limited to a combination of this kind, and it may also be applied to a case where image data other than RGB data is input, and this data is converted into image data other than CMYK data. The present invention can also be applied to cases where CMYK data is input to the image forming apparatus and color conversion is not performed in the image forming apparatus.

Furthermore, the granularity index is not limited to being the R.A.P.S. as described in the present specification, and another granularity index may be used.

If the R.A.P.S. is used as the granularity index, the component corresponding to the direction in which the density non-uniformity occurs can be removed readily on the basis of the angle in the radial coordinate system of the power spectrum, as described previously. However, if another granularity index is used, then processing which conforms to the calculation method of that granularity index should be considered.

Furthermore, in addition to granularity, processing for reducing anisotropy can also be carried out in combination with the granularity reduction processing. In other words, correction for reducing anisotropy is carried out on the basis of the threshold values in the threshold value matrix. In this case, the anisotropy index described in the present specification may of course be used as an anisotropy index.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus which forms an image on a prescribed recording medium by carrying out digital halftoning using a threshold value matrix, the apparatus comprising:
a plurality of nozzles which eject ink toward the recording medium to form an image;
an ejection characteristics determination device which determines ejection characteristics of each of the nozzles; and
a threshold value correction device which performs first threshold value correction to reduce density non-uniformity occurring in the image due to error in the ejection characteristics of the nozzles, by correcting the threshold value matrix according to the error in the ejection characteristics of the nozzles, and performs second threshold value correction to reduce granularity in the image by correcting the threshold value matrix having undergone the first threshold value correction, according to threshold values in the threshold value matrix.

2. The image forming apparatus as defined in claim 1, wherein the threshold value correction device performs the first threshold value correction by specifically considering a threshold value column corresponding to a nozzle having error in the ejection characteristics, of a plurality of threshold value columns in the threshold value matrix corresponding respectively to the nozzles, and multiplying a plurality of threshold values in the threshold value column under consideration by a correction coefficient corresponding to the error in the ejection characteristics of the nozzle.

3. The image forming apparatus as defined in claim 1, wherein the threshold value correction device performs the second threshold value correction by exchanging threshold values for each other, within one of a plurality of threshold value columns in the threshold value matrix corresponding respectively to the nozzles.

4. The image forming apparatus as defined in claim 1, wherein the threshold value correction device calculates a prescribed granularity index according to threshold values in the threshold value matrix, and performs the second threshold value correction in such a manner that the granularity index comes within a target range.

5. The image forming apparatus as defined in claim 4, wherein the threshold value correction device calculates Radially Averaged Power Spectrum (R.A.P.S.) of the threshold value matrix by excluding power corresponding to a direction in which density non-uniformity occurs, and performs the second threshold value correction in such a manner that the granularity index specified by the R.A.P.S. comes within the target range.

6. The image forming apparatus as defined in claim 5, wherein the threshold value correction device calculates the R.A.P.S. by:
taking a threshold value column direction of the threshold value matrix corresponding to the direction in which the density non-uniformity occurs one-dimensionally, to be a y axis of the threshold value matrix;

taking one of frequency coordinate axes in a two-dimensional coordinate system (fx, fy) expressing a two-dimensional power spectrum of the threshold value matrix corresponding to the y axis of the threshold value matrix, to be an fy axis;

taking the other of the frequency coordinate axes perpendicular to the fy axis, to be an fx axis;

taking a radial coordinate system corresponding to the two-dimensional coordinate system (fx, fy), to be (fr, θ);

specifying an angle $\theta_0$ to define a range to be excluded from calculation of the R.A.P.S., of all angles of the radial coordinate system (0°≦θ≦360°) such that power caused by the first threshold value correction and appearing on and around the fx axis is excluded from determination of the granularity; and calculating the R.A.P.S. by excluding the range defined by the angle $\theta_0$.

7. The image forming apparatus as defined in claim 1, wherein the threshold value correction device divides the threshold value matrix into a plurality of divided areas and performs the second threshold value correction for each of the divided areas.

8. The image forming apparatus as defined in claim 7, wherein the divided areas overlap partially with each other at an overlap section;

when evaluating the granularity relating to each of the divided areas, the threshold value correction device evaluates the granularity relating to each of the divided areas by including the overlap section in each of the divided areas to which the overlap section belongs; and when performing the second threshold value correction for the divided areas, the threshold value correction device corrects the threshold values in each of the divided areas by permitting threshold value correction in the overlap section in respect of one of the overlapping divided areas, while exclusively prohibiting the threshold value correction in that overlap section in respect of the other of the overlapping divided areas.

9. An image processing method of optimizing an image formed on a prescribed recording medium by means of a digital halftoning method using a threshold value matrix, the method comprising the steps of:

determining ejection characteristics of each of a plurality of nozzles which eject ink onto a recording medium;

performing a first threshold value correction to reduce density non-uniformity occurring in the image due to error in the ejection characteristics of the nozzles, by correcting the threshold value matrix according to the error in the ejection characteristics of the nozzles; and performing a second threshold value correction to reduce granularity in the image by correcting the threshold value matrix having undergone the first threshold value correction, according to threshold values in the threshold value matrix.

* * * * *